United States Patent
Meier-Hellstern et al.

(10) Patent No.: US 11,323,890 B2
(45) Date of Patent: May 3, 2022

(54) INTEGRATED MOBILITY NETWORK PLANNING

(71) Applicant: AT&T Intellectual Property I, L.P., Atlanta, GA (US)

(72) Inventors: Kathleen Meier-Hellstern, Cranbury, NJ (US); Laurie Bigler, Lafayette, CA (US); Arun Jotshi, Parsippany, NJ (US); Michael Orth, Edison, NJ (US); Phyllis Weiss, Englewood, NJ (US); Ravi Raina, Skillman, NJ (US); Wenjie Zhao, Princeton, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/507,567

(22) Filed: Jul. 10, 2019

(65) Prior Publication Data

US 2021/0014698 A1    Jan. 14, 2021

(51) Int. Cl.
*H04W 16/18* (2009.01)
*H04L 12/24* (2006.01)
(Continued)

(52) U.S. Cl.
CPC ........... *H04W 16/18* (2013.01); *H04L 41/147* (2013.01); *H04W 16/22* (2013.01)

(58) Field of Classification Search
CPC ...... H04W 16/18; H04W 16/22; H04L 41/147
See application file for complete search history.

(56) References Cited

U.S. PATENT DOCUMENTS

| 5,963,867 A | * | 10/1999 | Reynolds | H04W 16/18 455/446 |
| 6,336,035 B1 | * | 1/2002 | Somoza | H04W 16/18 455/423 |

(Continued)

FOREIGN PATENT DOCUMENTS

| JP | 2012129998 A | * | 7/2012 | ........... H04W 16/22 |
| WO | WO-0172072 A1 | * | 9/2001 | ........... H04W 16/18 |
| WO | WO-2009083035 A1 | * | 7/2009 | ........... H04W 24/02 |

OTHER PUBLICATIONS

"Deep Networks for Earth Observation", GitHub—nshaud/DeepNetsForEO: Deep networks for Earth Observation; https://github.com/nshaud/DeepNetsForEO, Downloaded on May 7, 2019.
(Continued)

*Primary Examiner* — Charles T Shedrick
(74) *Attorney, Agent, or Firm* — Guntin & Gust, PLC; John G. Rauch

(57) ABSTRACT

Aspects of the subject disclosure may include, for example, collecting and storing data about a communication environment including one or more communication networks wherein respective communication networks of the one or more communication networks employ respective communication technologies for communication with remote user devices in the communication environment, providing traffic forecasts of communication traffic, creating importance layers for potential build locations for equipment of the one or more communication networks, identifying desirable build locations among the potential build locations of the one or more communication networks based on the traffic forecasts of communication traffic and the importance layers, receiving user input defining planning parameters for the communication environment and determining respective target goal values for respective build options for the one or more communication networks based on the planning parameters, (Continued)

the identified desirable build locations and the traffic forecasts. Other embodiments are disclosed.

20 Claims, 15 Drawing Sheets

(51) Int. Cl.
*H04W 16/22* (2009.01)
*H04L 41/147* (2022.01)

(56) References Cited

U.S. PATENT DOCUMENTS

| | | | |
|---|---|---|---|
| 8,902,767 B2* | 12/2014 | Custer | H04W 16/22 370/252 |
| 9,736,649 B1 | 8/2017 | Do et al. | |
| 10,425,832 B1* | 9/2019 | Zawadzki | H04L 41/5038 |
| 10,455,540 B2 | 10/2019 | Balappanavar et al. | |
| 10,693,730 B2* | 6/2020 | Harpur | H04L 41/0896 |
| 10,728,769 B1 | 7/2020 | Jotshi et al. | |
| 2006/0083170 A1* | 4/2006 | Silva | H04W 16/22 370/238 |
| 2006/0106530 A1* | 5/2006 | Horvitz | G08G 1/0104 701/117 |
| 2007/0088709 A1* | 4/2007 | Bailey | H04N 5/2627 |
| 2010/0014441 A1* | 1/2010 | Middleton-Hand | G06Q 10/06 370/254 |
| 2011/0194456 A1* | 8/2011 | Fordham | H04L 41/145 370/254 |
| 2016/0037356 A1 | 2/2016 | Bathula et al. | |
| 2016/0078272 A1 | 3/2016 | Hammoud | |
| 2017/0041806 A1 | 2/2017 | Randall et al. | |
| 2017/0257778 A1* | 9/2017 | Priest | H04N 7/185 |
| 2018/0139623 A1 | 5/2018 | Park et al. | |
| 2018/0157911 A1 | 6/2018 | Lo et al. | |
| 2019/0075430 A1 | 3/2019 | Lincoln et al. | |
| 2019/0354741 A1 | 11/2019 | Yang | |
| 2020/0082168 A1 | 3/2020 | Fathi et al. | |
| 2020/0096999 A1 | 3/2020 | Pellerite et al. | |
| 2020/0104503 A1 | 4/2020 | Iwasaki et al. | |
| 2020/0178085 A1* | 6/2020 | Ertimo | H04W 24/04 |
| 2020/0304219 A1 | 9/2020 | Park et al. | |
| 2020/0396134 A1 | 12/2020 | Jotshi et al. | |

OTHER PUBLICATIONS

"DigitalGlobe", Elevate your perspective. MDS, Radian Solutions, SSL; http://digitalglobe.com, Downloaded on May 7, 2019.

"Neapmap", Park Your Truck, https://go.nearmatp.com/, Downloaded on May 7, 2019.

* cited by examiner

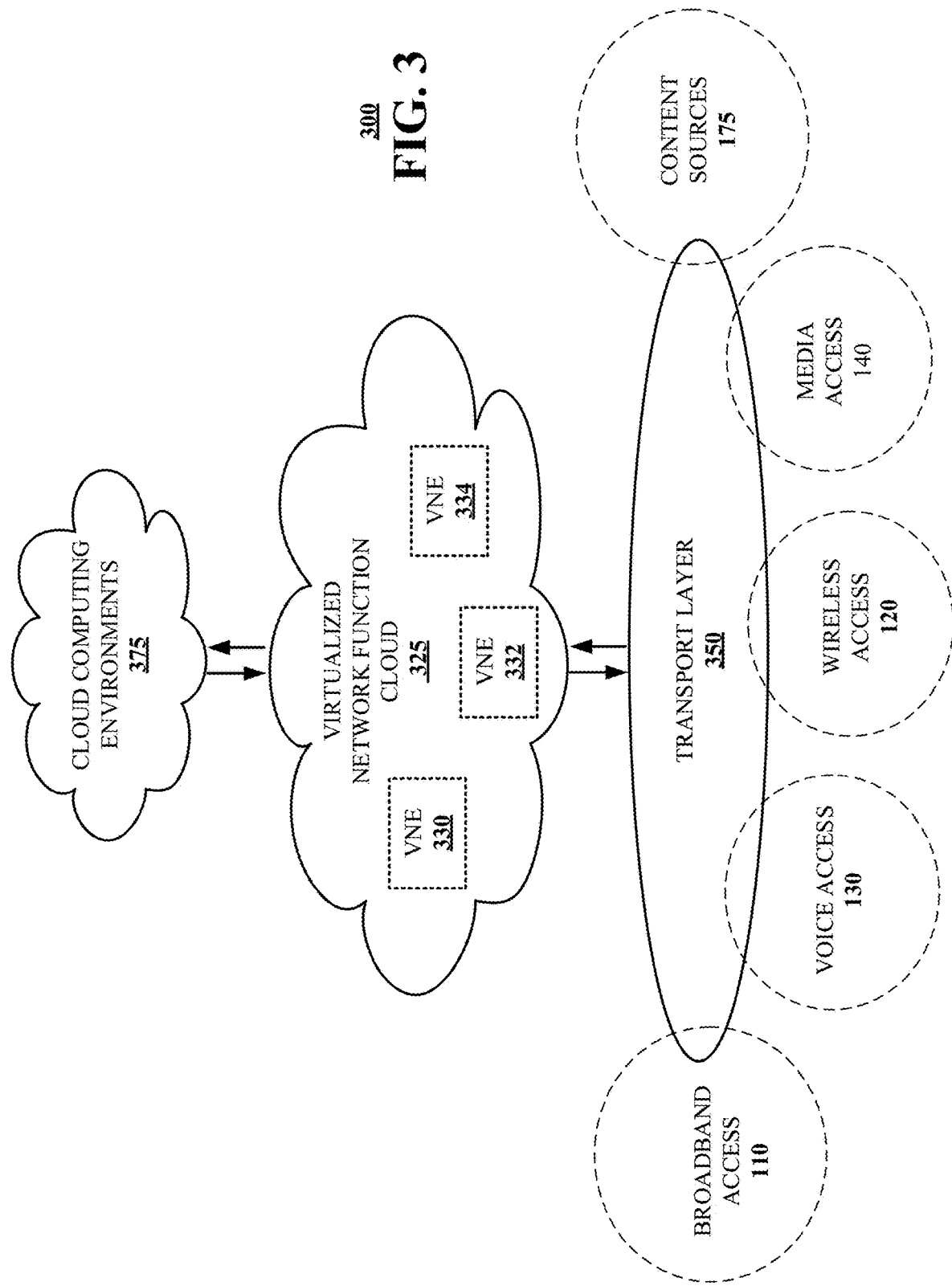

INTEGRATED MOBILITY NETWORK PLANNING

FIELD OF THE DISCLOSURE

The subject disclosure relates to integrated mobility network planning.

BACKGROUND

Mobile networks provide communication services for devices in service regions. As smart phones and other portable devices become ubiquitous, mobile networks must be expanded to accommodate growing demand. In addition, there is an increase in number and type of available communication technologies for implementing and expanding mobile network coverage and capacity.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for efficient and automatic planning and build out of mobile communication networks. Other embodiments are described in the subject disclosure.

One or more aspects of the subject disclosure include identifying and prioritizing opportunities for expansion of one or more mobile networks which employ differing communication technologies such as cellular, fiber, fixed wireless, etc.

One or more aspects of the subject disclosure allows providing efficient capital spending and enables nimble plan adjustments to accommodate available capital across a variety of domains including traditional radio access networks (RAN) and disaggregated radio access networks, fixed wireless networks, and fiber networks.

One or more aspects of the subject disclosure include allowing users to select the right communication technology in the right geographical region to maximize or increase performance metrics such as Return on Investment (ROI). This includes allowing users the ability to prioritize builds based on business mandates, network performance indicators, importance metrics and investment costs.

Figure 1:
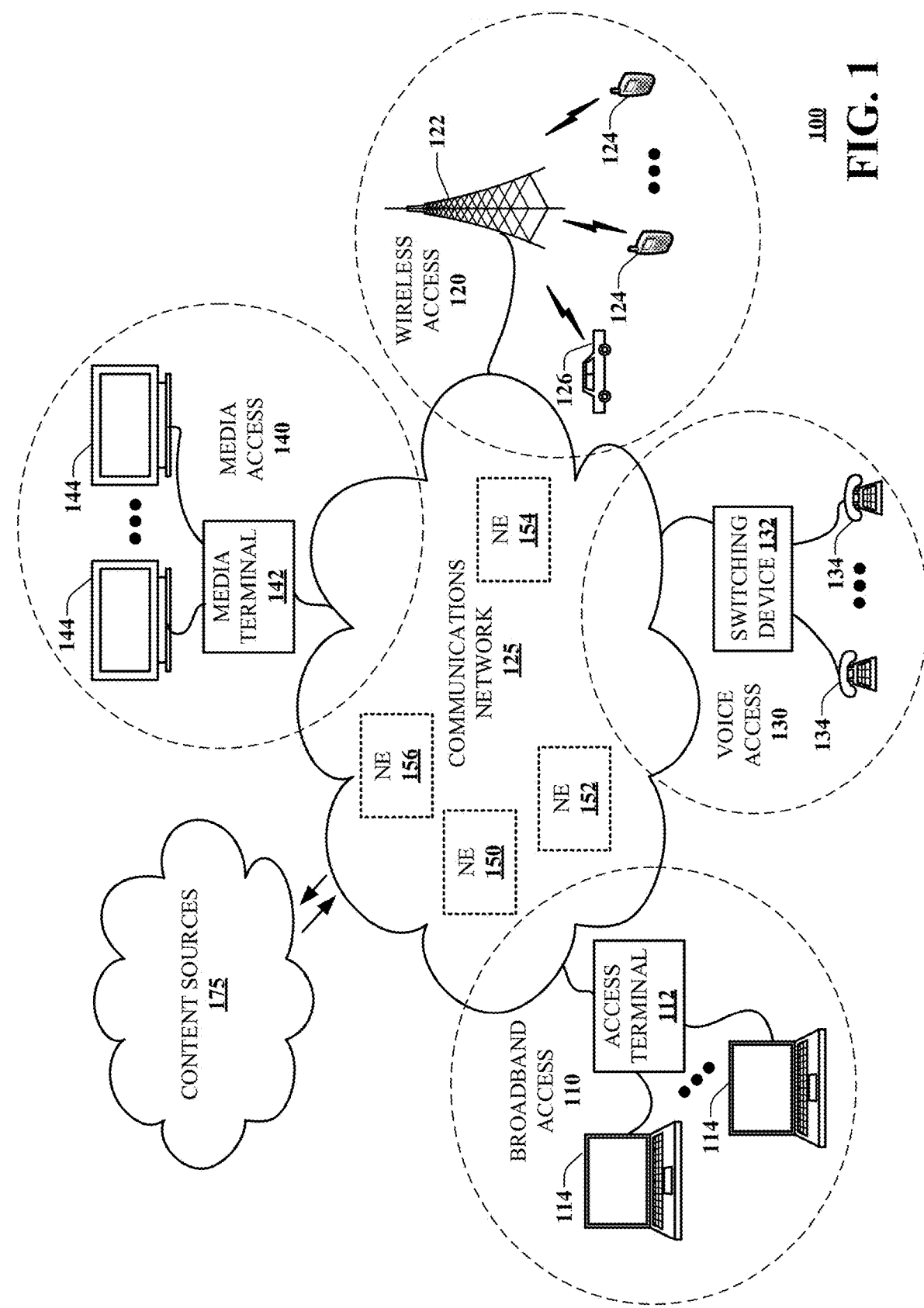
FIG. 1 is a block diagram illustrating an exemplary, non-limiting embodiment of a communications network in accordance with various aspects described herein.

One or more aspects of the subject disclosure allow a user or communication network operator to accommodate changing technological requirements in existing communication networks such as development of new communication technologies, expansion of communication traffic beyond current capacity and expansion of the communication networks to new geographical regions, including collecting information about the existing networks Referring now to FIG. 1, a block diagram is shown illustrating an example, non-limiting embodiment of a communications environment 100 in accordance with various aspects described herein. The communications environment 100 may include one or more communications networks operated by a system operator. For example, communications environment 100 can facilitate in whole or in part providing communication services to fixed and mobile devices in various geographical locations using a variety of communication technologies over a variety of communication networks. The respective communication networks employ respective communication technologies such as cellular radio communication, WiFi communication, mm-Wave communication, satellite communication, broadband, and others now known or later developed. As network demand varies, and as new communication network technologies become available or as the relative cost of building out the communication environment 100 changes, one or more aspects of the subject disclosure enable and automate planning, selecting and building out one or more respective networks of the communication environment 100 to achieve various technological, service and financial goals. A user can perform "what if" simulations to see the effects of various network planning options for the communication environment 100.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a fourth generation (4G), fifth generation (5G), or higher generation cellular base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, voice over internet protocol (VoIP) gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

From time to time, one or more of the communications network 125, the broadband access 110, wireless access 120, voice access 130, media access 140 may require expansion or reconfiguration to accommodate changes in traffic or technological capabilities. For example, availability of new handset types, such as 5G cellular, may require building out the wireless access 120 with new or additional base stations or access points 122 to add network capacity to accommodate growing 5G communication traffic. In the present context, building out a communication network includes operations such as identifying a need for additional communication infrastructure, determining what type or technology is required, such as 5G or broadband or fiber, etc., determining physical locations for new or additional equipment, installing the new or additional equipment and bringing the new or additional equipment into service. Building out a network may also include substituting one type of communication network technology for another type, due to various technical and business factors. A wide variety of factors may be considered during the process, including factors of technological choice, environmental factors, financial factors and marketing factors.

Figure 2A:
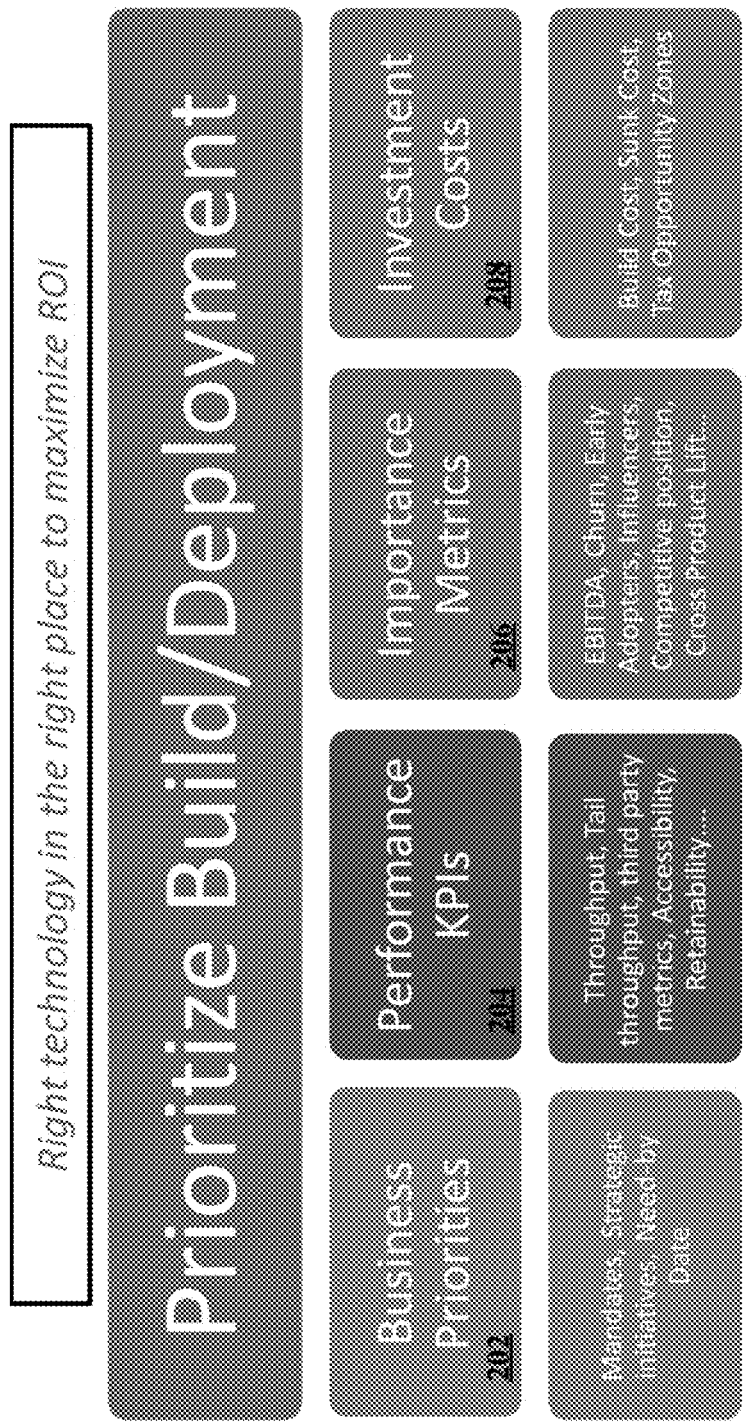
FIG. 2A is a block diagram illustrating an example, non-limiting embodiment of a system for planning expansion and build out of aspects of the communication network of FIG. 1 in accordance with various aspects described herein.

FIG. 2A is a block diagram 200 illustrating an example, non-limiting embodiment of a system for planning expansion and build out of aspects of the communication environment 100 of FIG. 1 in accordance with various aspects described herein. When a network such as the communication environment 100 is being planned for expansion or reconfiguration, many aspects must be balanced and prioritized. The block diagram 200 shows one embodiment of a set of build priorities based on business mandates, network performance indicators, importance metrics and investment costs, as shown in FIG. 2A.

In some aspects, the subject disclosure provides an integrated planning platform for planning configuration, reconfiguration and expansion of a communication network such as the communication environment 100 of FIG. 1. The integrated planning platform provides a planning tool for a user such as an operator of the communication environment 100. Network build out can be expensive and require substantial investment by a network operator in real estate, equipment, labor and other factors. Network build out can take months or years to accomplish. Because of the time and money involved, it is important to plan accurately and with reliable information. The planning tool permits the user to make financial and other decisions about network planning using current data. The planning tool permits optimization of capital spending and enables nimble plan adjustments to accommodate available capital across a variety of domains including traditional radio access networks (RAN), disaggregated RAN, Fixed Wireless networks, and Fiber. The planning tool allows users to select the right technology in the right place to increase or maximize a target goal value for one or more networks or for the system operator of the networks. In some examples, the target goal value is a financial target goal, such as Return on Investment (ROI) or profitability. In other examples, the target goal value is a technological target goal, such as network capacity or throughput or latency.

The exemplary block diagram 200 shows one embodiment of a set of build prioritization dimensions, including business priorities 202, performance key performance indicators (KPIs) 204, importance metrics 206 and investment costs 208. Business priorities 202 include items which have an economic or financial significance to the business entity that owns, operates, develops or maintains the communication environment 100. Business priorities 202 include factors related to markets for communication services, competitive environment, corporate goals. This can include mandates, such as expanding a communication network into a new geographical area or market segment. This can include strategic initiatives, like leading in a newly developed market such as 5G cellular, or time or financial factors such as a deadline to complete a project.

Performance KPIs 204 in the integrated planning platform can include factors related to providing communication service, measuring service factors such as quality and reliability, etc. KPIs 204 in some embodiments include measuring data throughput, which is a measure of the average achievable bit rate, or tail throughput which reflects bit rate that is achievable a high percentage of time. Other KPIs 204 can include objective or subjective measurements of performance such as a data transmission speed test produced by a third party provider. Other KPIs can include accessibility, which measures success rate of attempts to access a network, or retainability, which measures the ability of a call to successfully complete as intended by the user. Some of the KPIs 204 may be established as industry standard factors such as accessibility and retainability. Others may be established by the network operator as performance goals.

Importance metrics 206 include corporate business factors that prescribe and measure successful operation of communication environment 100 as a business. Importance metrics 206 may include financial factors such as earnings before interest, tax, depreciation and amortization (EBITDA), which is a financial or accounting measure of corporate operating performance. Importance metrics 206 may also include churn or churn rate, which may refer to the proportion of contractual customers or subscribers who leave a supplier during a given time period. Importance metrics 206 may also include a measure of number or percentage of subscribers or potential subscribers to telecommunication service who are early adopters, or individuals who start using a product or technology as soon as it becomes available. Importance metrics 206 may also include a measure of quantity of influencers or individuals who can affect purchasing decisions of others because of apparent knowledge or authority or relationship with an audience, such as on social media. Importance metrics 206 may also include a measure of quantity of subscribers or potential subscribers who are likely to accept a newly offered telecommunication service, or new service terms or subscribers who are likely to adopt a newly available telecommunication technology, such as 5G or other technical features. Importance metrics 206 may also include a measure of quantity of subscribers or potential subscribers who have particular hobbies or interests, such as frequent travelers or recreational vehicle (RV) owners. Importance metrics 206 may also include a measure of quantity of subscribers or potential subscribers who are affiliated with an enterprise, such as small business owners or operators. Importance metrics 206 may also include a measure of quantity of subscribers or potential subscribers who participate in online games or gamers. Importance metrics 206 may also include a measure of quantity of subscribers or potential subscribers who particularly value one or more network features or KPIs such as data communication. Importance metrics 206 may also include a measure of quantity of subscribers or potential subscribers who have expressed a degree of satisfaction or dissatisfaction with performance of an existing telecommunication network. Other importance metrics 206 can include competitive position or the value of a brand or product or service relative to others in a market, cross product lift, which may describe an effect on sales of one product because of or in relation to sales of another product. Importance metrics 206 may include other factors or measures of success of a business, a product or a service.

Investment costs 208 include expenditures that are required or optional as part of expanding or reconfiguring communication environment 100. Investment costs 208 can include build costs, such as the costs of new equipment, real estate costs to purchase or lease areas to locate infrastructure equipment. Investment costs 208 can include sunk costs which are expenditure already made for existing items, goods or services. Investment costs 208 can include other costs such as tax opportunity zones or any other expense that may be accounted for when planning for an expanded or reconfigured communication network.

The integrated planning platform in accordance with the block diagram 200 and embodiments of the subject disclosure can be used to evaluate a single technology network as well as to design an optimal multilayer communication network. In a single technology network, a single communication technology such as 5G cellular, 5G mmWave, 802.11 WiFi, or others, may be planned an implemented. A multilayer communication network incorporates different technologies or technology layers, where each layer operates in support of the others. In some embodiments, the integrated planning platform in accordance with the subject disclosure enables users to perform rapid, iterative what-if scenario analysis in which inputs to a network plan are specified and varied to see a modelled effect. Such planning allows a network operator to accommodate increasing customer demand and growth change based on data-driven decision making. Such planning allows users to prioritize build options based on a variety of metrics that are mapped to geospatial coverage areas.

Figure 2B:
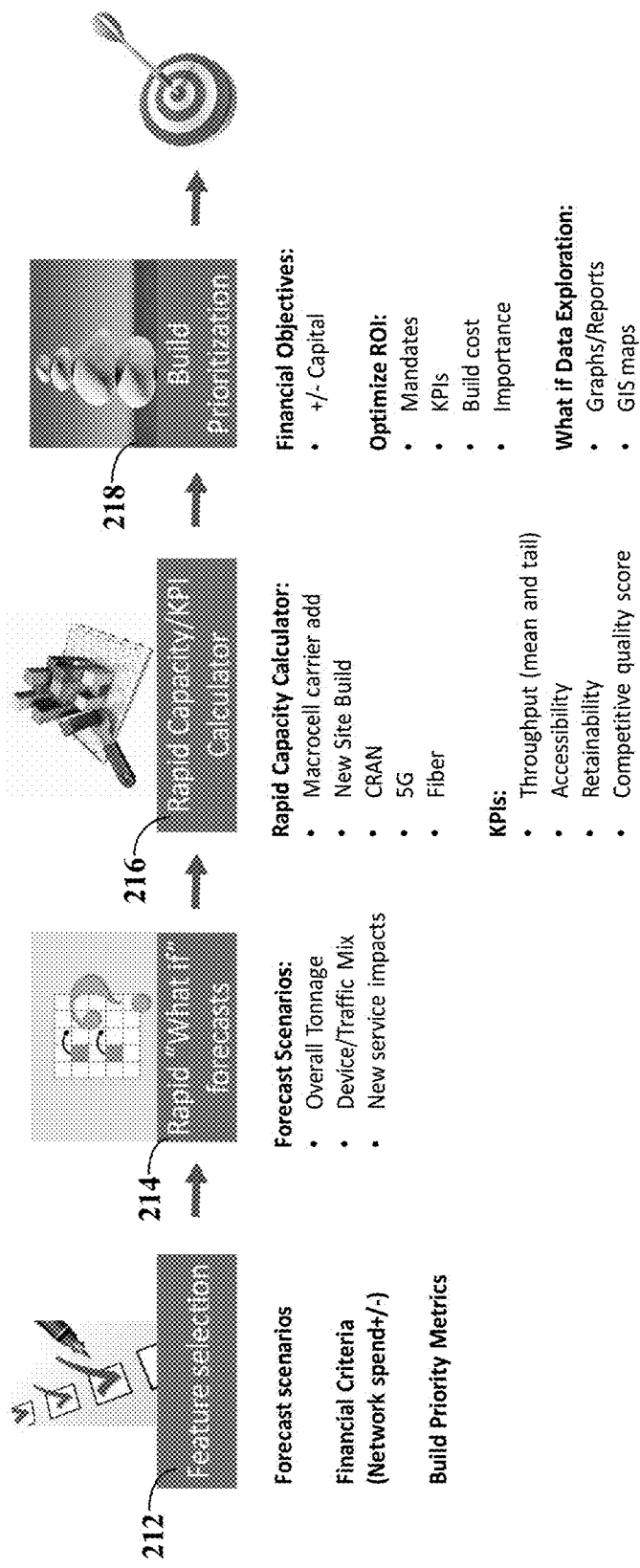
FIG. 2B is a block diagram illustrating an example, non-limiting embodiment of functional components of an integrated planning platform for planning and build out of the communication network of FIG. 1 in accordance with various aspects described herein.

FIG. 2B is a block diagram illustrating an example, non-limiting embodiment of functional components of an integrated planning platform 210 for planning and build out of the communication environment 100 of FIG. 1 in accordance with various aspects described herein. The integrated planning platform 210 in one embodiment includes a feature selection module 212, a rapid what-if forecasting module 214, a rapid capacity/KPI calculator 216 and a build prioritization module 218. Other embodiments of the integrated planning platform 210 may include alternative, additional or fewer functional modules, depending on implementation requirements. Also, other embodiments may group or separate functional aspects of the integrated planning platform differently to accommodate different design and implementation goals. The modules which provide the functional capabilities of the integrated planning platform 210 may be implemented using hardware such as a processor system including a processor and a memory for storing data and instructions, software, or any suitable combination of these.

The feature selection module 212 in some embodiments allows users to enter different forecast scenarios for one or more communication networks of the communication environment 100, financial criteria for network investment, build priority metrics and technology metrics. The forecast selection module 212 operates as a user interface to receive user inputs to the integrated planning platform 210. The user inputs specify details of a forecast scenario to be tested by the integrated planning platform 210. Such details may include communication technologies of interest (5G, fiber, WiFi, for example) and geospatial information such as a region or neighborhood for possible expansion, or customer features such as prevalence of early adopters of a new technology. Such details may also include financial criteria such as timing and availability of investment in the network.

The rapid what-if forecasting module 214 in some embodiments may allow users to perform rapid what-if studies based on a variety of factors of interest to the user. For example, a user may specify overall tonnage or traffic volume, device and traffic mix, and new service impacts. The aforementioned examples are illustrative and other dimensions may also be added or substituted. Upon receipt of the user specified forecast scenarios, the integrated planning platform 210 will model the effect on a communication system such as the communication system 100 of the forecast scenario, using techniques and processes described in the subject disclosure. The capability to perform rapid scenario analysis allows users to perform sensitivity analysis to a variety of network scenarios.

The rapid capacity/KPI calculator 216 allows users to quickly calculate where capacity is needed for each individual communication technology based on one or more key performance indicators (KPIs). Example KPIs include network throughput, accessibility, retainability and a competitive quality score. These are intended to be exemplary KPIs and not exhaustive. Any suitable KPI or other performance metric or indicator that may be of interest to the user or to an owner or operator of a communication network may be specified.

The rapid capacity/KPI calculator 216 may determine which communication technology may require, or benefit from, or be the best candidate for expansion or reconfiguration from among a group of available communication technologies. Examples of such technologies include microcellular networks including all-in-one base stations, as in for example, in first generation (1G) and second generation (2G) networks), distributed base stations as in third generation (3G) cellular networks, building base stations or access points, for example, at new sites. Other example of such technologies include centralized radio access networks (CRAN), fifth generation (5G) cellular networks, fiber networks and others. As one example, based on specified key performance indicators, the rapid capacity/KPI calculator 216 may determine which network should be built out or expanded, and where, in order to meet forecast capacity changes.

The build prioritization module 218 provides network planning information for a user or an operator of a communication network based on information received by the forecast selection module 212, information produced by the rapid what-if forecasting module 214 and information received by and produced by the rapid capacity/KPI calculator 216. The build prioritization module 218 may group leading candidates across multiple build technologies, constrained by the financial objectives, mandates, KPIs and build timing constraints. The integrated planning platform 210 can accommodate a variety of optimization or efficiency functions and constraints using a feature selection capability of the forecast selection module 212, which in turn drives the build prioritization function of the build prioritization module 218. The build prioritization module 218 may operate to increase or optimize a target goal value. The target goal value may include one or more financial features such as return on investment (ROI). In some examples, the target goal may be a technological target goal, such as network capacity or throughput or latency. Further, the build prioritization module 218 may provide various data visualization facilities, such as geographic information system (GIS) maps, graphs and reports in various formats that may be specified by the user.

The build prioritization module 218 may use other importance metrics and financial or cost metrics for determining a build prioritization. Some example financial metrics include EBITDA, profitability, and 5G early adopters. Another example financial metric is cross-product lift, in which mobility investment drives fiber adoption. Another financial metric may include business information such as strategic growth zones, including for example, real-estate development, population density, environmental considerations, etc.

Other metrics used by the build prioritization module 218 may be competitive in nature, aggregated across geographic areas These may include, for example, third party reported network performance metrics, network-driven churn, aggregated information about penetration of other network services, and customer characteristics such as percentages of customers who prioritize network quality, versus price of network service or other factors, or percentages of customers who have heavy influence on the behavior of the people with whom they communicate.

Still other metrics that may be used by the build prioritization module 218 may relate to build cost, that is, the expenditure necessary to acquire and buy equipment and real estate to build out a planned network. These factors may include a total build cost, a sunk build cost, a need-by date for the network, feasibility of building a planned network, given all factors, fiber proximity, pole characteristics where infrastructure equipment may be installed on existing or to-be-installed telephone poles.

The network planning information provided by the build prioritization module 218 may be used by the user or an operator of one or more communication networks of the communication environment 100 (FIG. 1) to test network expansion, configuration and reconfiguration models and to select a communication network according to the planning information. Selecting a communication network for expansion or configuration or reconfiguration may include deciding on which network of a plurality of existing networks of the communication environment to expand or deciding to develop and configure a new network. Selecting a communication network for expansion or configuration or reconfiguration may also include selecting a radio communication technology to use, such as LTE or 5G cellular or WiFi or WiMax. The network planning information provided by the build prioritization module 218 may also be used by the user or an operator of one or more communication networks to build out the selected communication network. Building out the network in some embodiments may include financing the building out project, acquiring real estate if required, acquiring spectrum if required, acquiring equipment such as new fixed radio communication equipment or wireline backhaul equipment, if required, installing new equipment or repurposing old equipment to new locations or new functions and other processes as well. Each respective process may require sub-processes such as purchasing equipment, scheduling work crews, installing the equipment, and so forth. The network planning information provided by the build prioritization module 218 may be used by the user or an operator of one or more communication networks to fully plan and implement new or expanded communication networks.

More details about the operation of the respective modules of the integrated planning platform 210 will be provided throughout the subject disclosure.

Figure 2C:
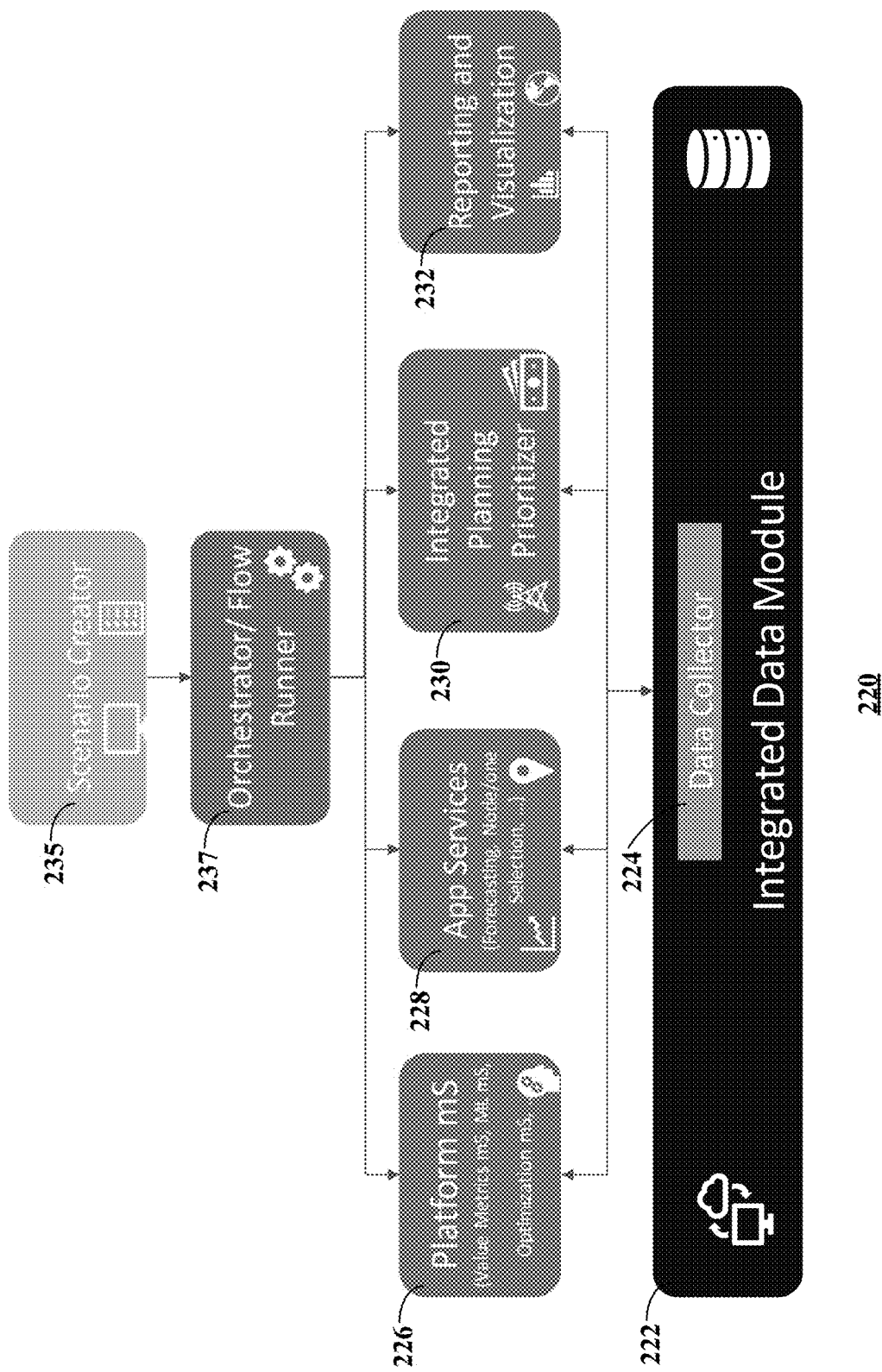
FIG. 2C is a block diagram illustrating an example, non-limiting embodiment of a platform architecture for planning and build out of the communication network of FIG. 1 in accordance with various aspects described herein.

FIG. 2C is a block diagram illustrating an example, non-limiting embodiment of a platform architecture 220 for planning and build out of the communication network of FIG. 1 in accordance with various aspects described herein. The platform architecture 220 includes an integrated data module 222, a data collector 224, a platform microservices module 226, an application services module 228, an integrated planning prioritizer module 230, a reporting and visualization module 232, a scenario creator module 235 and an orchestrator module 237. In various embodiments, the platform architecture 220 may include more or fewer functional modules than are shown in the exemplary embodiment of FIG. 2C. Similarly, the functions for the modules described herein may be distributed among different structural components in alternative embodiments. The modules forming the platform architecture 220 may be implemented in hardware such as a processor system including a processor and a memory for storing data and instructions, software, or any suitable combination of these.

Figure 2D:
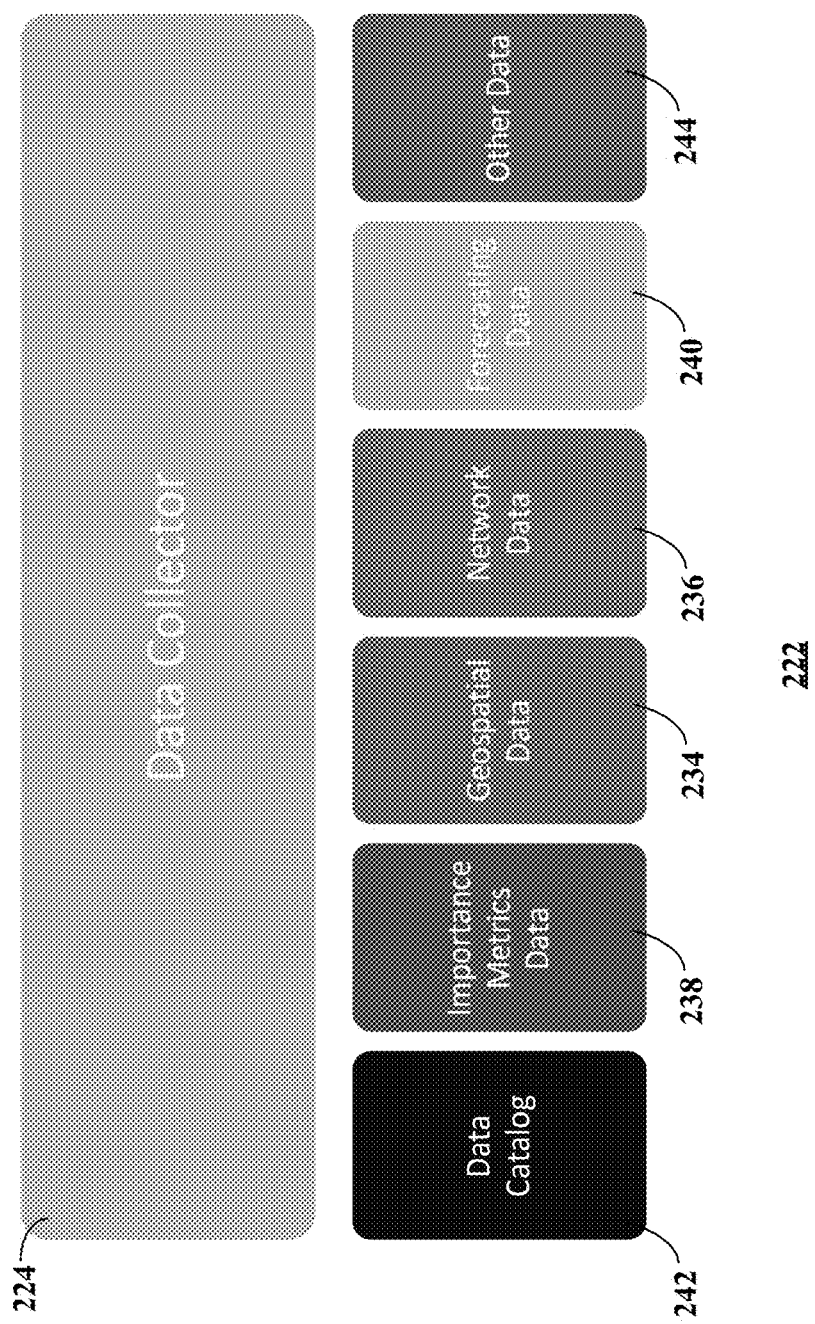
FIG. 2D is a block diagram illustrating an example, non-limiting embodiment of an integrated data module for use in the architecture of FIG. 2C in accordance with various aspects described herein.

FIG. 2D is a block diagram illustrating an example, non-limiting embodiment of an integrated data module 222 for use in the architecture of FIG. 2C in accordance with various aspects described herein. The integrated data module 222 stores data for use by other modules of the platform architecture. The stored data may be collected from a wide variety of sources. The stored data may include high quality physical environmental data such as geospatial data 234 about a physical environment of the communication environment 100. The stored data may further include network data 236, importance metrics data 238, forecasting data 240, a data catalog 242, other data 244 and the data collector 224.

The geospatial data 234 stored in the integrated data module may be enriched using machine learning and may be integrated from across multiple data sources to create an accurate, enriched, geo-spatially tagged, consistent set of data. Geotagging or geo-spatial tagging involves associating information defining one or more geographical locations with data, such as a street address, map coordinates, etc. In some embodiments, the geospatial data 234 is consistently geo-tagged and duplicates are removed for identified assets so that that the stored data can be used across many environments and use cases. The geospatial data 234 may be stored in a geospatial database so that different datasets can be correlated with each other. Examples of data included in geospatial data are information about buildings, trees, fiber, streetlamps and utility poles. Other data and data types may be included as well.

Network data 236 may include information about network configuration and observed network performance, such as information about traffic communication hot spots, where surges in traffic occur in time or geographical location, etc., and other historical data The network data 236 may further include information about competitive networks and network performance information. The network data 236 may further include information about network KPIs such as throughput, accessibility, retainability etc., as well as information on deployed network inventory The importance metrics data 238 may include information about parameters of interest to a user or an operator of a communication system such as communication system 100 (FIG. 1). Examples of information that may be included in importance metrics data 238 are EBITDA for an area of the network; information about influencers; information about financial or economic factors such as profitability, churn, customer experience; and information about early adopters. Other data and data types may be included in the importance metrics data 238 as well.

Forecasting data 240 stored in the integrated data module 222 may include information about traffic forecasts by device type and technology at multiple levels of granularity. For example, the forecasting data 240 may include information about the number of 5G devices expected to become active on a network or in a region or forecasting selection of new devices among a set of early adopter subscribers of new technology. In another example, the forecasting data 240 may include information about internet of things (IoT) devices predicted to become active. The forecasting data 240 may further include information such as a spectrum exhaust forecast, or when a network or network portion no longer has sufficient spectrum to handle expected traffic, and the like. Other data and data types may be included in the forecasting data 240 as well.

The integrated data module 222 includes a data catalog 242. The data catalog 242 contains information about the location of data sources and format, and stores the information needed to implement access and security controls. Other data and data types may be included in the data catalog as well.

The data collector 224 collects and moves data as requested by a given application of the architecture 220 or the orchestrator 237 (FIG. 2C). The data collector 224 in some embodiments all extract, translate and load (ETL) functions that may be part of accessing the integrated data store 222. Open application programming interfaces (APIs) may be used to extract data for import to downstream design engines or other data processing destinations. The APIs may also provide a common interface for adding or updating data to the architecture 220.

Figure 2E:
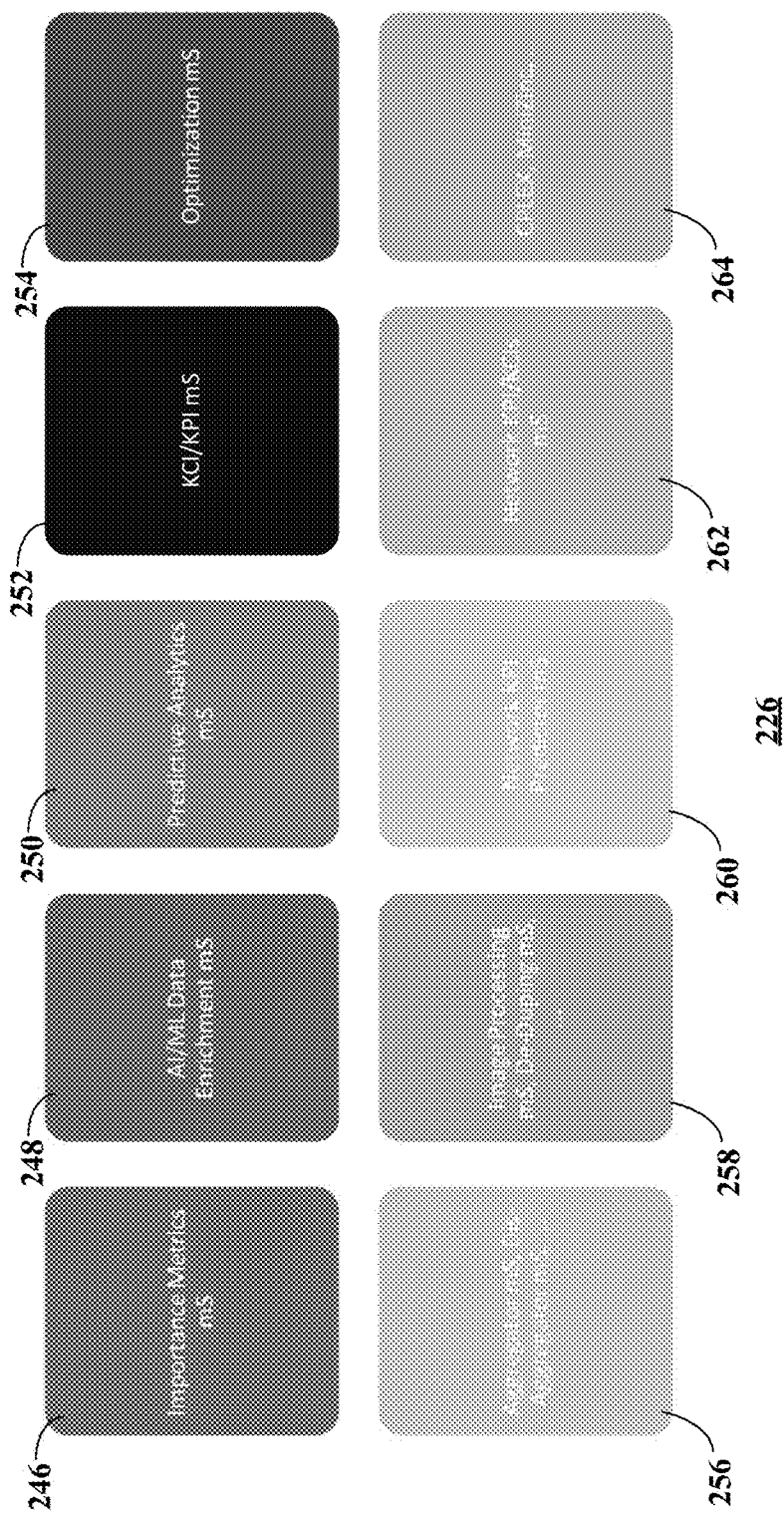
FIG. 2E is a block diagram illustrating an example, non-limiting embodiment of a platform microservices module for use in the architecture of FIG. 2C in accordance with various aspects described herein.

FIG. 2E is a block diagram illustrating an example, non-limiting embodiment of a platform microservices module 226 for use in the architecture of FIG. 2C in accordance with various aspects described herein. The platform microservices module 226 in some embodiments includes generic, non-planning-specific microservices that can be utilized to operate the architecture 220. These may include but are not limited to an importance metrics module 246, an artificial intelligence module 248, a predictive analytics module 250, a KCI/KPI composer module 252 and an optimization module 254. Other modules and functions may be included as well in alternative embodiments. In the illustrated embodiments, such modules include an aggregator-disaggregator module 256, an image processing module 258, a network KPI predictor module 260, a network KPI/KCI module 262 and data processing tools 262.

The importance metrics module 246 in some embodiments may include services or microservices that aggregate or disaggregate all raw importance metric data to a desired location level metric. The desired location level may refer to a geographic location of interest. For example, the desired location level could be at a tower level such as a cellular network tower, a small cell level corresponding to a cellular small cell, a bin-level, corresponding to a region of specific size, such as 50 m×50 m. In other examples, the desired location level could include other geographical levels such as postal code, city, etc.

The artificial intelligence module 248 in some embodiments may include services or microservices for data enrichment of data like geospatial data. This may include, for example, data enrichment of information about telephone poles, buildings and their attributes.

The predictive analytics module 250 in some embodiments may include services or micro services that predict network KPIs given the perturbations to the underlying data. In one example, the predictive analytics module 250 may predict throughput impact based on whether or not a carrier is added to the communication network, or based on small cell deployment etc. Other examples are possible, as well.

The KCI/KPI composer module 252 in some embodiments may provide services or microservices for converting raw network measurements to key performance indicators (KPI) or key capacity indicators (KCI) in a consistent manner.

The optimization module 254 in some embodiments may include optimization services or microservices that help run some optimization or improvement functions in a reliable and efficient manner. In the context of the subject disclosure, optimization may have the widest range of meanings. An aspect of the disclosure may be optimized against one or more aspects. Multiple aspects may be mutually optimized. The result of some optimizations may be that no aspect, on its own, is strictly optimal, but a group of two or more mutually optimized aspects or factors may be optimal as a group while individual aspects may be suboptimal. Optimization includes consideration of all pertinent factors, but objective measures and subjective considerations.

The aggregator microservices module 256 may in some embodiments include services or microservices that aggregate or disaggregate data collected about distributed devices, systems or processes. The image processing service module 258 may in some embodiments provide services or microservices for processing image data collected from various sources for use by a user. The network KPI predictor module 260 may in some embodiments provide services and microservices for predicting values of key performance indicators (KPIs) of one or more networks. The network KPI/KCI module 262 may in some embodiments provide services or microservices for processing key performance indicator (KPI) and key control indicator (KCI) information for one or more networks. The data processing tools 262 may in some embodiments provide services or microservices for processing data by and in conjunction with the other modules of the microservices module 256. Example of the data processing tools 262 may include the CPLEX optimizer and the MiniZinc constraint modelling language. Other suitable tools may be added or accessible as well.

The modules shown in FIG. 2E are intended to be exemplary only. In other embodiments, different modules providing different functions and capabilities may be provided. The modules forming the microservices module 256 may be implemented in hardware such as a processor system including a processor and a memory for storing data and instructions, software, or any suitable combination of these.

Figure 2F:
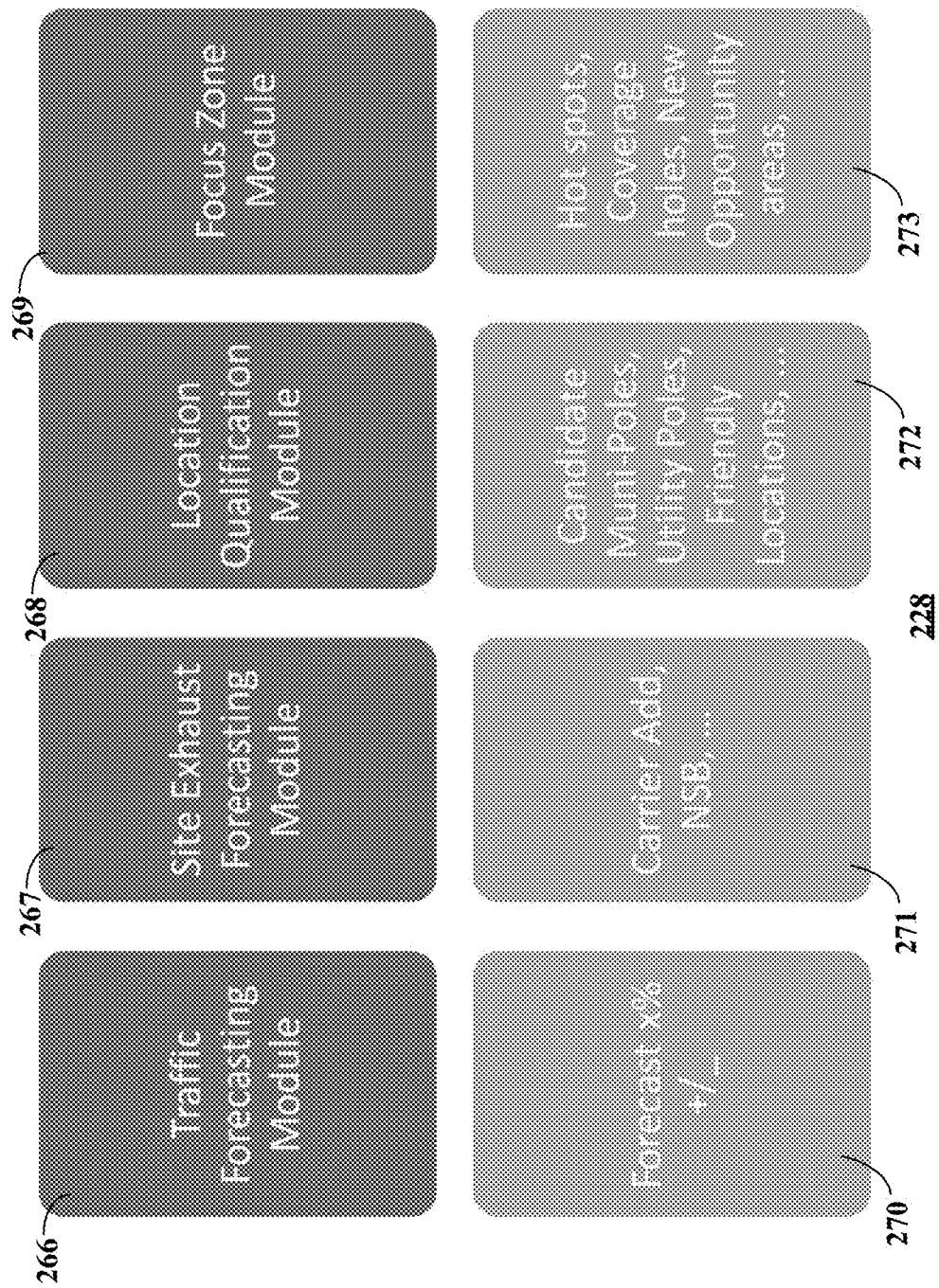
FIG. 2F is a block diagram illustrating an example, non-limiting embodiment of an application services module for use in the architecture of FIG. 2C in accordance with various aspects described herein.

FIG. 2F is a block diagram illustrating an example, non-limiting embodiment of an application services module 228 for use in the architecture of FIG. 2C in accordance with various aspects described herein. The application services module 228 includes applications that cooperate to implement functions such as optimization of a target goal. One example of target goal optimization is return on investment (ROI) optimization. Another example of target goal optimization is network capacity optimization over multiple communication networks. The application services module 228 in the embodiment of FIG. 2F includes a traffic forecast module 266, a site exhaust forecasting module 267, a location qualification module 268, a focus zone module 269.

The traffic forecast module 266 in some embodiments may provide granular short-term and long-term traffic forecasts as needed for various purposes required by the architecture 220 of FIG. 2C. The traffic forecast module 266 may provide forecasts as forecast output 270. The traffic forecast module 266 may provide forecasts according to any of a wide range of classes or categories of information. Examples of such classes or categories include a specified device technology, a device type and capability, a network technology, a subscriber data plan, a Quality of Service Class Identifier, a line of business and core platform. The traffic forecast module 266 may provide forecasts at market level, at submarket level, and site face level. One exemplary approach is to have a general forecast solution that serves the rapidly evolving access and core architecture. More specific forecasts can be developed from the general forecast. These forecasts produced by the traffic forecast module 266 can be provided as inputs to the other application services of the application services module and may call upon statistical analysis and data integration, validation, and cleansing, that allows bridging between different data sources and inputs from marketing sources of information and engineering sources of information. The integrated forecast service provided by the traffic forecast module 266 can allow for modeling high-level changes in traffic such as changes in data plans, efficiency controls, handset mix. For example, changes in customer data plans can cause an increase in relative traffic volume if customers will be able to use more data at a reduced cost and can cause a decrease in relative traffic volume if customers will have increased cost for data usage. Similarly, a change in the handset mix operating on a communication network, the types and numbers and capabilities of active handsets used by consumers, may cause a relative change in traffic volume. If more customers will be downloading large content files such as video content, relative traffic will increase. If early adopters are inclined to buy handsets with video presentation capability, such traffic will begin to increase as the early adopters acquire their handsets and become active on the network. Similarly, low-level location specific offers such Wireless Internet or rollouts to specific regions, may cause a relative increase in traffic volume in a particular network. Additionally, the large amount of historical data collected as input to forecasting can also support the focus zone module 269 through the integrated data layer 222 (FIG. 2D).

The site exhaust forecasting module 267 in some embodiments may provide short and long-term site exhaust forecasts as needed for various purposes as identified by the traffic forecast module 266. Based on the proposed tuning in the traffic forecasting module 266, the site exhaust forecast module 267 appropriately forecasts the sites that will reach spectrum exhaust by what month or year or other time period. The site exhaust forecasting module 267 provides output 271 as information about carrier additions and other information.

The location qualification module 268 in some embodiments may create enrichment data for potential build locations such as streetlamps or utility poles. Enrichment data may include any suitable or useful information about a potential build location, including geographic or geospatial information pertaining to the location, a textual or other description of the location and its surroundings, an image or other visual or graphic information, and any other information or attributes that may be pertinent to a planner or the planning operation. The enrichment data may include information about variable or modifiable aspects of the location or a feature of the location. The enrichment data may include information about the radio environment for radio and other communications in the region of the location, such as existing communication network infrastructure, known radio interference sources or dead zones, competitive information, etc. In some embodiments, the location qualification module 268 may employ machine learning to derive location attributes for the potential build locations such as height, material, or decorative features. The location qualification module 268 may then combine information about the physical characteristics of the build location with other relevant information such as fiber proximity to the build location, line of sight between potential antenna locations and potential future subscribers, and building characteristics at the build location, to create a respective enrichment data for each respective potential build location. The enrichment data may be organized in any suitable manner, such as a data table, a vector or a file of data organized according to a predetermined format. The predetermined data format may be selected or specified to simplify collection of the data forming the enrichment data, storage of that data, communication of that data to other components of the platform architecture 220 and processing by such other components. This may reduce storage space required for the data or may speed processing and communication of the data. The enrichment data is used as input to the focus zone module 269.

The location qualification module 268 in some embodiments may also contain radio propagation information for potential build locations that can be used to further refine the score of potential locations. The location qualification module 268 provides as output 272 information about candidate municipal poles, utility poles, etc. which may qualify as potential build locations for expansion or reconfiguration of a communication network.

The focus zone module 269 in some embodiments may be used in conjunction with Centralized-Radio Access Network (CRAN) and millimeter wave (mmWave) network deployments to identify areas that define the most desirable places to upgrade or build based on factors such as traffic demand, RF propagation, interference pattern, transport cost, pole or street furniture availability, as well as competitive or revenue data. Other factors may be used by the focus zone module 269.

In some embodiments, the focus zone module 269 retrieves data from the integrated data layer 222 (FIG. 2D) and combines the retrieved data through a series of optimization functions to identify the most valuable zones for investment. Zones under consideration may be defined as geographical regions, neighborhoods, networks, sub-networks, etc. In some embodiments, any suitable optimization function or model may be used by the focus zone module 269. Further in some embodiments, any suitable factor or target goal may be optimized. Example factors include technological factors such as network throughput, forecasted change in traffic, RF propagation, interference pattern, transport cost, pole/street furniture availability, competitive or customer experience metrics. etc. An advanced mathematical model may be used to consider any suitable input data to produce focus zones that address network capacity needs and maximize the return on investment, in one exemplary embodiment. Output information 273 from the focus zone module 269 may include information about network performance such as hot spots of relatively high traffic volume, coverage holes where traffic exists but coverage is poor, and new opportunity areas where traffic may grow in the future. The output information 273 from the focus zone module 269 in some embodiments is provided to the integrated planning prioritization module 230 (FIG. 2C) for incorporation into optimal technology selection.

It is noted that, as used herein, optimization, including optimal technology selection, may not result in a strictly optimal result or choice or selection. In some instances, multiple factors are being weighed or mutually optimized. In such a case, the result may be suboptimal as regards one or more or all factors, but when considered across the group of factors, the result may be optimal. Optimization includes both objective, measurable factors as well as subjective factors.

Figure 2G:
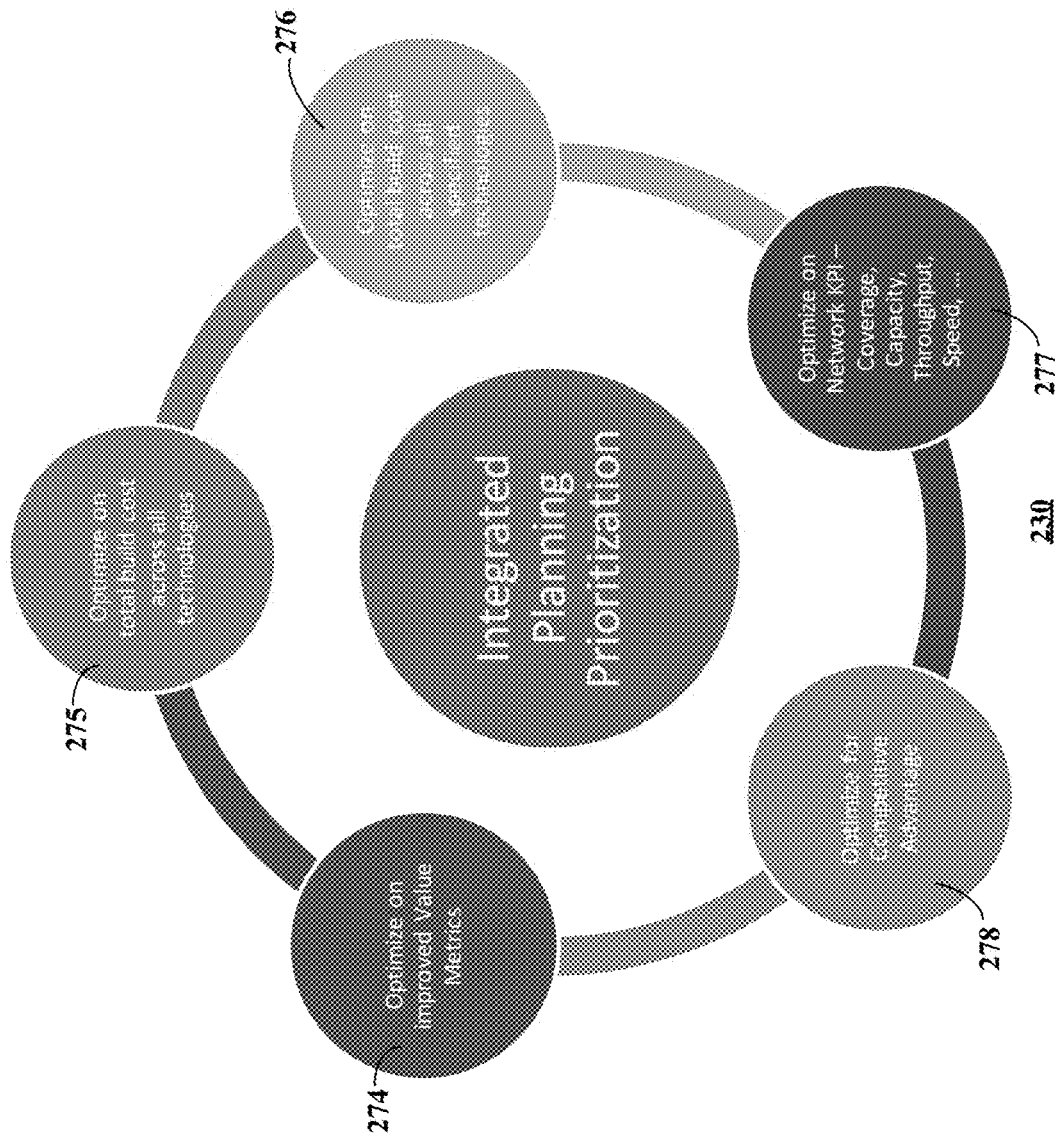
FIG. 2G is a block diagram illustrating an example, non-limiting embodiment of an integrated planning prioritization module for use in the architecture of FIG. 2C in accordance with various aspects described herein.

FIG. 2G is a block diagram illustrating an example, non-limiting embodiment of an integrated planning prioritization module 230 for use in the architecture of FIG. 2C in accordance with various aspects described herein. In the exemplary embodiment of FIG. 2G, the integrated planning prioritization module 230 includes a plurality of build optimization functions, including an "optimize on importance metrics" function 274, an "optimize on total build cost across all technologies" function 275, an "optimize on total build cost across specified technology groups" function 276, an "optimize on network KPIs" option 277 and an "optimize for competitive advantage" function 296. Other build optimization functions may be specified in other embodiments, as well, and the noted options may be modified or combined in any suitable manner to accomplish particular goals of a user or an operator of a communication network. The "optimize on importance metrics" function 274, the "optimize on total build cost across all technologies" function 275, the "optimize on total build cost across specified technology groups" function 276, the "optimize on network KPIs" option 277 and the "optimize for competitive advantage" function 278 may be implemented in hardware such as a processor system including a processor and a memory for storing data and instructions, software, or any suitable combination of these. In some embodiments, a user may access scenario creator module 235 (FIG. 2C) to specify or select a build optimization function to be implanted or tested by the integrated planning prioritization module 230.

In some embodiments, the integrated planning prioritization module 230 calculates target goal values such as one or more return on investment values (ROIs) by comparing deployment costs associated with each of the technology options with coverage requirements and total revenue potential. The technology options in some exemplary embodiments may involve 5G cellular, mmWave, fiber, etc. The integrated planning prioritization module 230 uses input from the focus zone module 269 (FIG. 2F) and data from the integrated data layer 222 (FIG. 2D) to determine an optimal investment choice, in terms of technology, location and time. The integrated planning prioritization module 230 in some exemplary embodiments simultaneously considers multiple technologies, such as radio access network (RAN), Disaggregated RAN which includes more modular components with defined interfaces for communication between components, Fixed Wireless networks, Centralized-Radio Access Networks (CRAN), 5G mmWave, Fiber, etc. The integrated planning prioritization module 230 in some embodiments selects the optimal technology, while accounting for interactions among technologies. Build decisions are made considering a rich set of criteria specified using the scenario creator module 235 (FIG. 2C). The criteria for evaluating and making build decisions include any suitable technology, business or other criteria, such as business mandates, strategic initiatives, target performance KPIs, importance metrics, competitive metrics and investment costs. The integrated planning prioritization module 230 takes input from some or all layers including importance metric data such as, for example, speed tests, competitive footprint, return on investment (ROI), churn, influencers, subscribers who are early adopters, subscribers who have other particular interests such as an interest in new product offers or newly developed technology or devices, or subscribers who own or operate an enterprise such as a small business or who are gamers, cross product lift and other information. The integrated planning prioritization module 230 may further take inputs from layers or factors such as build costs, deployment and build timing for various deployment alternatives. The integrated planning prioritization module 230 may further consider intelligent placement candidates that are evaluated and given a score using attributes of the physical environment, such as proximity to fiber, pole height, attributes and composition, line of sight, proximity to buildings, etc. The integrated planning prioritization module 230 operates with consistent, accurate, enriched, geo-spatially tagged and de-duped physical environment data such as geospatial data 234.

Based on the business question or technological question to be answered, for example as specified by a user accessing scenario creator module 235, the integrated planning prioritization module 230 calls different optimization functions or chains multiple optimization functions together to determine one or more target goal values. In some embodiments, the target goal values may be an optimization of a value or function related to network operation or cost or build out. In the exemplary embodiment of FIG. 2G, the integrated planning prioritization module 230 calls one or more optimization functions from among the "optimize on importance metrics" function 274, the "optimize on total build cost across all technologies" function 275, the "optimize on total build cost across specified technology groups" function 276, the "optimize on network KPIs" option 277 and the "optimize for competitive advantage" function 278. The objective of optimization functions can be financial centric (such as ROI, capital spend and net return rate) or network centric (such as capacity, coverage, quality and performance metric). Network metrics may be linked to financial metrics via new revenue opportunities when coverage is extended or when network quality is improved. Network metrics are linked to financial metrics via lost revenue due to churn when network quality deteriorates, for example. Most business requirements, technology-specific rules and network performance and quality needs can be formulated as constraints. With the different combinations of objective function and associated constraints, the integrated planning prioritization module 230 can be utilized in embodiments to find optimal or near-optimal answers to a wide variety of network investment problems.

Two such examples are presented below. Other examples may be readily apparent. Parameters and variables may be defined first.

Let:
m is the month index over depreciation period from 1 to M;
c is the cell site index from 1 to C;
$C_{\_mandate}$ is the list of sites that are required for technology update (such as carrier add);
j is the technology option index from 1 to J;
cap(c, j) is the amount of capital required to enable technology option j at cell site c;
cap_ca(c) is the amount of capital required for carrier add at cell site c;

t(c, j, m) is the binary decision variable to indicate if technology j is enabled at cell site c starting from month m. Once it is enabled, this technology remains active for all remaining months;

$t_{ca(c,m)}$ is the binary variable to indicate if carrier add should be performed at site c in month m;

R(c, m) is net revenue for cell site c in month m. It is defined as $$R(c,m) = R(c,m-1) - R\text{churn}(c,m) + R\text{new}(c,m)$$

where

R(c,m−1) is the revenue from the previous month. Note R(c, 0) is known based on billing;

Rchurn(c, m) is the revenue loss due to churn for cell c in month m. It is calculated as $$R\text{churn}(c, m) = \sum_{i=1}^{I} p(i, si(i, m)) * \alpha(i, c) * v(i, m)$$

where i is the index of existing customer from 1 to I;

(i, si(i, m)) is the probability of churn for customer i in month m based on its usage weighted average composite network quality score si(i, m) in this month. This probability is a key input.

$$si(i, m) = \sum_{c=1}^{C} sc(c, m) * \alpha(i, c)$$

where sc(c,m) is the composite network quality score for cell site c in month m. It is modeled based on traffic volume, all enabled technologies in month m in cell site c. Note that calculation of sc(c,m) is the most difficult part of the problem. It is highly nonlinear and it is also highly dynamic based on what technologies are enabled for a given site in a given month. Moreover, sc(c,m) cannot be calculated for each site individually. They need to be modeled for a large cluster to capture the mutual interference among different sites.

α(i,c) is the fraction of usage for customer i at cell site c. Note that $$\sum_{c=1}^{C} \alpha(i, c) = 1$$

for each i.

v(i,m) is the value of customer i in month m. It can be defined as the monthly billing revenue with added monetary value based on social influence and other attributes.

Rnew(c,m) is the new revenue that can be generated at cell site c in month m, given the composite network quality score sc(c,m). It must be modeled beforehand and provided as an input. Both of new revenue and churn are functionally dependent on the composite network quality score (sc(c,m), si(i,m) respectively).

opex(c,m) is the operation cost for cell site c in month m.

Example 1

Optimize Macrosite Carrier Adds Based on a Throughput Exhaust Metric

Objective: maximize total revenue gain (or minimize total revenue loss)

$$\sum_{m=1}^{M} \sum_{c=1}^{C} R(c, m)$$

1. Constraints:

A. Capital spending limit:

$$\sum_{m=1}^{M} \sum_{c=1}^{C} cap\_ca(c) * t\_ca(c, m)$$

B. List of cell sites where carrier adds must be performed (mandates)

$$\sum_{m=1}^{M} t\_ca(c, m) \geq 1 \text{ for } c \in C\_mandate$$

2. Key inputs:

Revenue gain for each site as a function of network quality score

Revenue loss due to churn for each site as a function of network quality score

Network quality score for each site with and without the carrier add

Cost of carrier add for each site

Example 2

Determine the Optimal Technology Deployment Options to Maximize Total Net Return on Investment

Objective: maximize total net return on investment $$\sum_{m=1}^{M} \sum_{c=1}^{C} \left( R(c, m) - opex(c, m) - \sum_{j=1}^{J} cap(c, j) * t(c, j, m) \right)$$

1. Constraints:

A. Capital spending limit (capital_limit)

$$\sum_{m=1}^{M} \sum_{c=1}^{C} \sum_{j=1}^{J} cap(c, j) * t(c, j, m) \leq capital\_limit$$

B. Minimum capital return rate (MinCapReturnRate)

$$\frac{\sum_{m=1}^{M} \sum_{c=1}^{C} \left( R(c, m) - opex(c, m) - \sum_{j=1}^{J} cap(c, j) * t(c, j, m) \right)}{\sum_{m=1}^{M} \sum_{c=1}^{C} \left( \sum_{j=1}^{J} cap(c, j) * t(c, j, m) \right)} \geq$$

$$MinCapReturnRate$$

2 Key inputs:

Cost of each technology option network quality score for each site under each technology option combination Revenue gain for each site as a function of network quality score Revenue loss due to churn for each site as a function of network quality score The reporting and visualization module 232 (FIG. 2C) provides system and method for reporting results of optimization functions of the integrated planning prioritization module 230. Graphical visualization, augmented reality (AR) or virtual reality (VR), or any suitable combination of these, may be used in some embodiments to visually interact with the data. The integrated data module 222 a wide variety of three dimensional (3D) data and high-resolution imagery that can be interactively explored using AR and VR, alone or in combination, or with other visualization techniques. This visualization capability allows planners to explore the environment near potential build locations, avoiding the need for costly site visits. Also, since the optimization scenarios may be multi-faceted, what-if data explorations are a key element of the platform architecture 220. This visualization capability allows users to interactively visualize in the form of reports or 2D/3D maps the impact of various parameter settings.

Figure 2H:
FIG. 2H illustrates an example, non-limiting embodiment of a sample visualization produced by one example of the architecture of FIG. 2C in accordance with various aspects described herein.

FIG. 2H illustrates an example, non-limiting embodiment of a sample visualization 279 produced by one example of the architecture of FIG. 2C in accordance with various aspects described herein. The sample visualization 279 shows buildings, foliage, physical assets and sample network information produced using inputs and collected data in accordance with the systems and procedures of the subject disclosure.

Figure 2I:
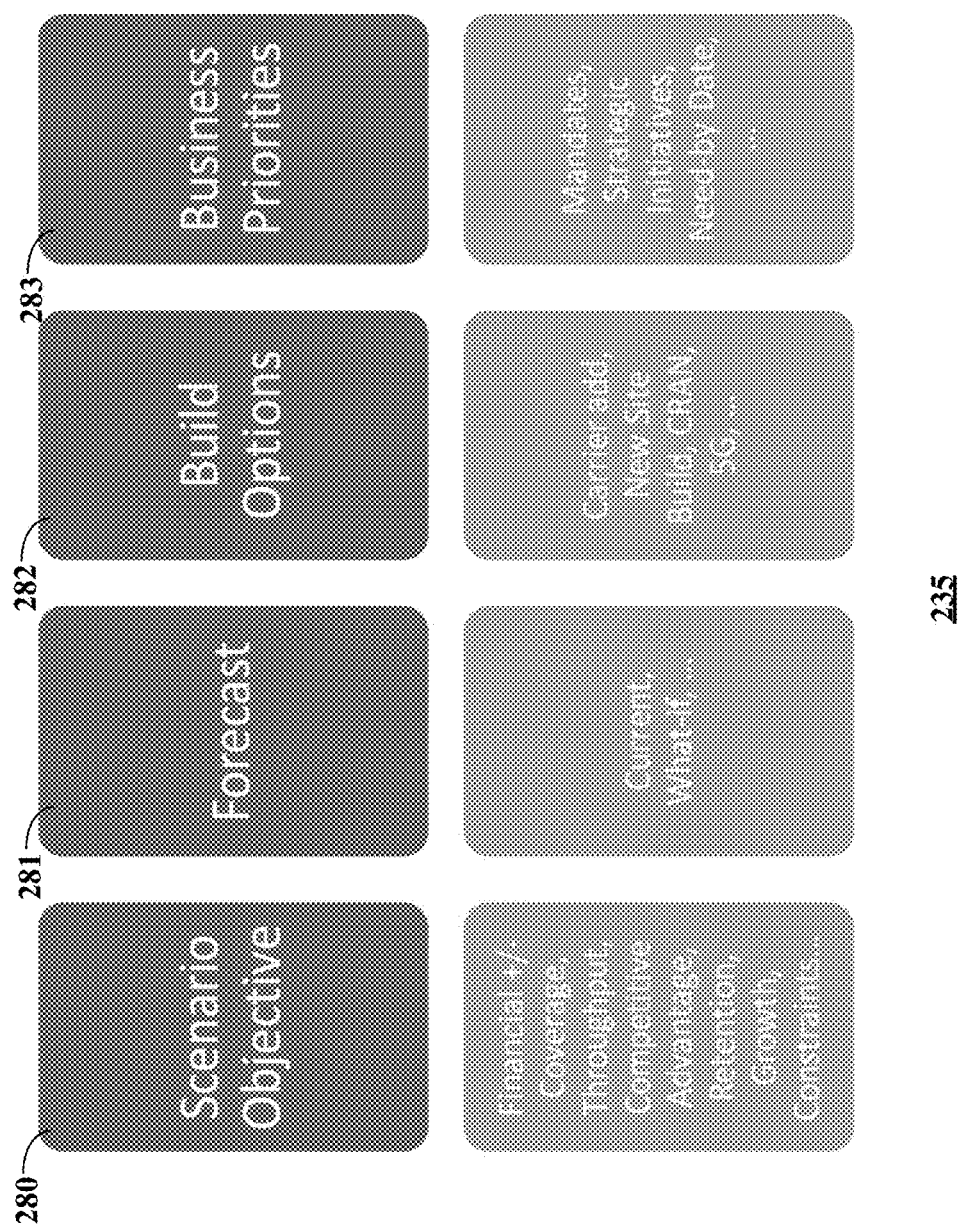
FIG. 2I is a block diagram illustrating an example, non-limiting embodiment of a scenario creator module for use in the architecture of FIG. 2C in accordance with various aspects described herein.

FIG. 2I is a block diagram illustrating an example, non-limiting embodiment of a scenario creator module 235 for use in the architecture of FIG. 2C in accordance with various aspects described herein. The scenario creator module 235 in some embodiments may include a scenario objective module 280, a forecast module 281, a build options module 296 and a business priorities module 283.

The scenario creator module 235 allows users to access the platform architecture 220 and model possible network configurations and specify one or more target goal values to be determined by the platform architecture 220. The target goal value may represent an aspect of planning, configuring or reconfiguring one or more networks of the communications environment 100 (FIG. 1). The target goal value may be a financial goal, such as return on investment or profitability. Or the target goal value may be a technological goal, such as network capacity, throughput, or latency. Or the target goal may be a business goal such as expanding one or more networks and network services to a new geographic area or neighborhood, or expanding to a new customer group. The user may do this, for example, by creating various what-if scenarios in which one or more inputs are varied and/or network information is varied and/or financial information is varied and the effect of the variations is modelled by the platform architecture 220.

In some embodiments, the scenario creator module 235 employs user-defined what-if interfaces to provide an easy-to-use capability to perform sensitivity analysis on the planning parameters. The interfaces could, for example, ask the user to:

1. Ask for the objective—what business question are we trying to ask. Some examples are:
   A. Given a budget, maximize the ROI and select appropriate technologies
   B. Given financial constraints, optimize the network KPIs
   C. Given financial constraints, prioritize the network build
   D. Given a budget maximize competitive advantage
   E. Given a budget maximize retention or growth
2. Select forecasting scenarios
   A. Current POR Forecast
   B. Make adjustments to forecast by changing device and traffic mix, tonnage etc., increase/decrease forecast by x %, and so on.
3. Select build options—Carrier Adds, New Site build, CRAN, 5G, . . .
4. Specify business priorities and mandates
   A. Strategic Initiatives,
   B. Business commitments
   C. Relative importance These are just a few examples of a few what-if scenarios related to business or financial goals of the communications environment 100 that a planner can run using the scenario creator module 235. Other scenarios are possible as well, including scenarios related to technological performance of one or more communication networks of the communication environment 100 of FIG. 1.

Also, platform service configurations may be set by platform microservices and in some embodiments may be in the form of JavaScript Object Notation (JSON) configuration files and/or datastore configuration tables. The platform architecture 220 in some embodiments has the capability of doing real-time or near-real-time configuration changes via application programming interface (API) calls.

The orchestrator module 237 (FIG. 2C) in some embodiments may form a workflow engine that coordinates all the activities among various modules within the platform architecture 220. Based on a given scenario being created in the scenario creator module 235, the orchestrator module 237 pulls all necessary or appropriate data from the integrated data module 222, initiates call to all needed microservices in the platform microservices module 226, and calls in the necessary application services from the application services module 228 before providing the collected information to the integrated planning prioritization module 230 for obtaining overall optimal solution and final reporting and visualization.

Figure 2J:
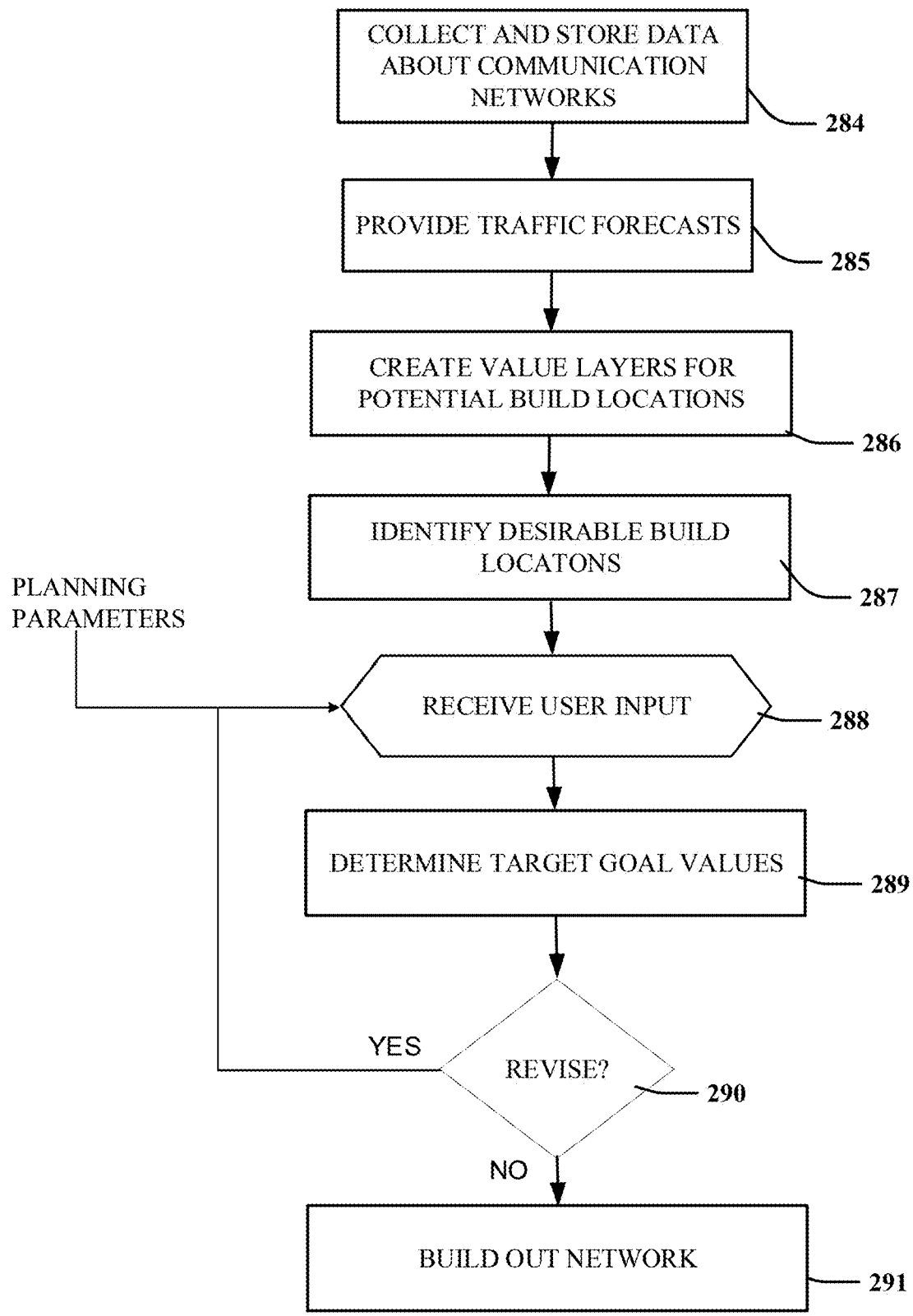
FIG. 2J is a flow diagram illustrating an example, non-limiting embodiment of a method for use in the architecture of FIG. 2C in accordance with various aspects described herein.

FIG. 2J depicts an illustrative embodiment of a method in accordance with various aspects described herein. At step 284, the method includes collecting and storing data about a communication environment such as the communication environment 100 of FIG. 1. The communication environment may include one or more communication networks operated by a system operator. In some embodiments, respective communication networks of the one or more communication networks employ respective communication technologies for communication with remote user devices in the communication environment. For example, one communication network may employ 3G cellular technology, another communication network may employ LTE or 4G cellular and another network may employ 5G cellular technology. The collected data may include any suitable or available data of interest, such as environmental data, network data for the one or more communication networks, importance metrics data and forecasting data.

At step 285, in some embodiments, the method includes providing traffic forecasts of communication traffic on the one or more communication networks. Traffic forecasts may be received from another source or collector for traffic information. Traffic forecasts may be developed based on existing information about subscriber types and numbers, handset device types and numbers, current network capacity and usage and other similar information.

At step 286, the method in some embodiments may include creating attributes for potential build locations for equipment of the one or more communication networks. The potential build locations may be physical sites where equipment of an expanded, reconfigured or new communication network may be built out. In some embodiments, the attributes may be physical attributes of a potential build location. Physical attributes might be height or site lines of a utility pole suitable for mounting radio equipment, or information about proximity of the potential build location to a fiber optic network. The attributes may include data about any information pertinent to communication network, the potential build locations, the environment at the potential build location, etc. Further, the attributes may be created as data stored in a particular predetermined format for communication and processing among networked data processing equipment.

At step 287, the method in some embodiments may include identifying desirable build locations among the potential build locations of the one or more communication networks. In some embodiments, the identification may be based on the traffic forecasts of communication traffic and the importance layers for the potential build locations.

At step 288, the method includes receiving user input defining planning parameters for the communication environment. The user input may be received from a user interface or other source. The user input may be used for planning a new network or changes to an existing network. The user input may be data and other information defining forecast scenarios for expansion, development or reconfiguration of one or more communication networks. The information may, in some examples, define changes to device and traffic mix and new services proposed for a communication network. In some embodiments, a user interface may invite the user to define an objective, for example a business question facing the operator of the network, such as given a budget, maximize the return on investment in the project and select appropriate communication technologies for the new or reconfigured network. Another possible example might be a technological objective, such as maximizing throughput on the new or reconfigured network, or maximizing capacity on the new or reconfigured network. Another possible example might be, given a budget, maximize retention of current subscribers or growth of new subscribers. Other examples, as described in the subject disclosure or as may be suitable, can be readily substituted.

In other examples, the user interface may invite the user to select a forecasting scenario. One example scenario might be, make adjustments to a forecast by changing device and traffic mix, tonnage, etc. Other examples, as described in the subject disclosure or as may be suitable, can be readily substituted.

In other examples, the user interface may invite the user to select build options, such as carrier additions, building new sites for fixed radio equipment, developing new technologies such as cloud radio access network (CRAN) or 5G cellular. Other examples, as described in the subject disclosure or as may be suitable, can be readily substituted.

In other examples, the user interface may invite the user to specify business priorities and mandates for the planning project. Some examples might include strategic initiatives and business commitments by the operator of the communication network, and the relative importance of the project. Other examples, as described in the subject disclosure or as may be suitable, can be readily substituted.

At step 289, the method in some embodiments includes determining respective target goal values for respective build options for the one or more communication networks. In some embodiments, the determination may be based on the planning parameters for the communication environment, the identified desirable build locations and the traffic forecasts of communication traffic. Target goal values may be any values to be optimized or maximized or minimized for a desired technological factor or business factor. For example, it may be desirable to maximize communication capacity on the communication network so that a maximum number of subscribers can be accommodated. Determining respective target goal values in such an example will involve processing the inputs to select a network configuration and technology that satisfies that goal. Another target goal value may be return on investment, where the operator of the communication network is investing assets in building out the network and desires to maximize the return on that investment, measured financially or technologically.

At step 290, the method in some embodiments may include determining if the planning process should be revised. In some embodiments, the method implements what-if analysis in which a user can test to see the effect of a specified modification to one or more of the inputs. The modification might be a change to communication technology, such as implementing a CRAN network, or a change to the subscribers such as providing a new type of handset to early adopters of a new technology or to other groups of subscribers with one or more particular interests, or expansion of the network to a new neighborhood or geographical area. Any suitable modification of interest in planning the network may be accommodated.

If the plan should be revised, based on user input or other information, in some embodiments, control returns to step 288 to receive additional input or otherwise continue processing. If not, control proceeds to step 291 in some embodiments. At step 291, for example procedures to build out a communication network based on the plan developed by the process of FIG. 2J may be undertaken. Building out the network may include acquiring equipment, installing the equipment, activating a radio network, acquiring real estate and spectrum, financing the project, and any other suitable steps.

While for purposes of simplicity of explanation, the respective processes are shown and described as a series of blocks in FIG. 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication environment 100, the subsystems and functions of system 200, and method 230 presented in FIGS. 1, 2A, 2B, 2C, and 3. For example, virtualized communication network 300 can facilitate in whole or in part method, device and computer readable medium for communication network planning. The virtualized communication network 300 may be the subject of a plan to develop or reconfigure the virtualized communication network by an operator thereof.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
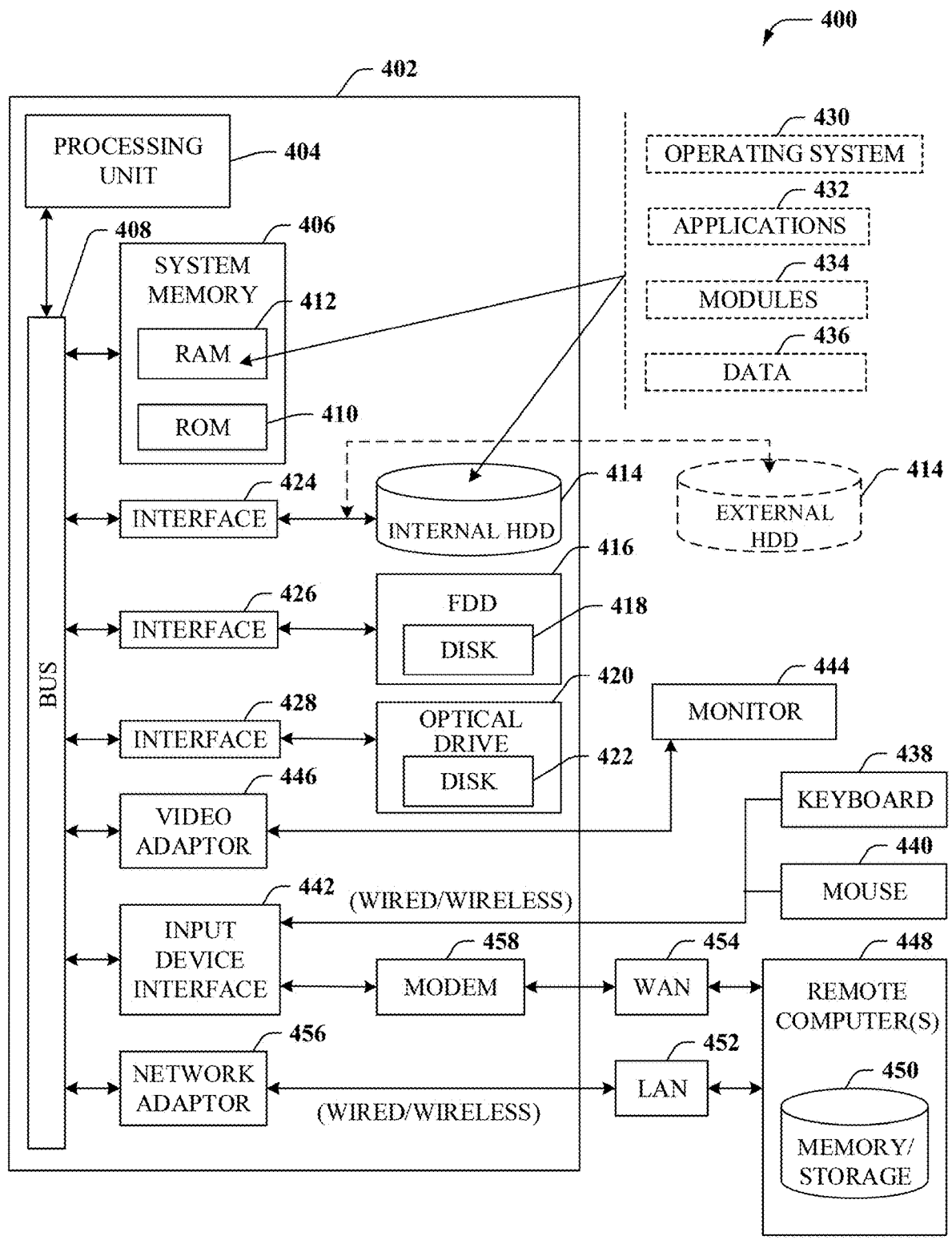
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a method, a device and a computer readable medium suitable for planning the development, configuration, expansion or reconfiguration of a communication network such as one of the communication networks in the communication environment 100 of FIG. 1. For example, one or more of the features of the platform architecture 220 of FIG. 2C may be facilitated by the computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
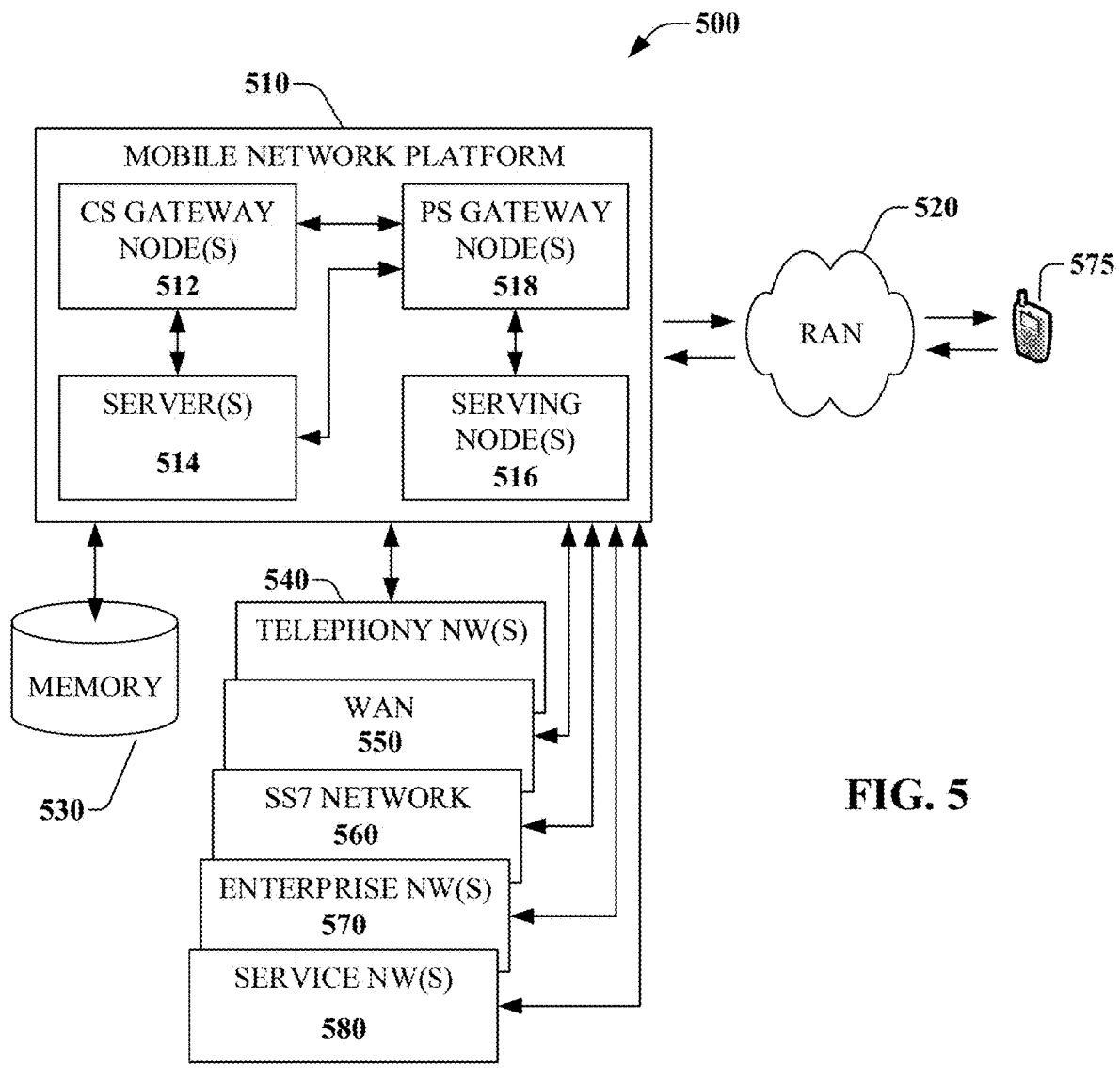
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a method, device of computer readable medium for planning a communication network which may include the mobile network platform 510. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
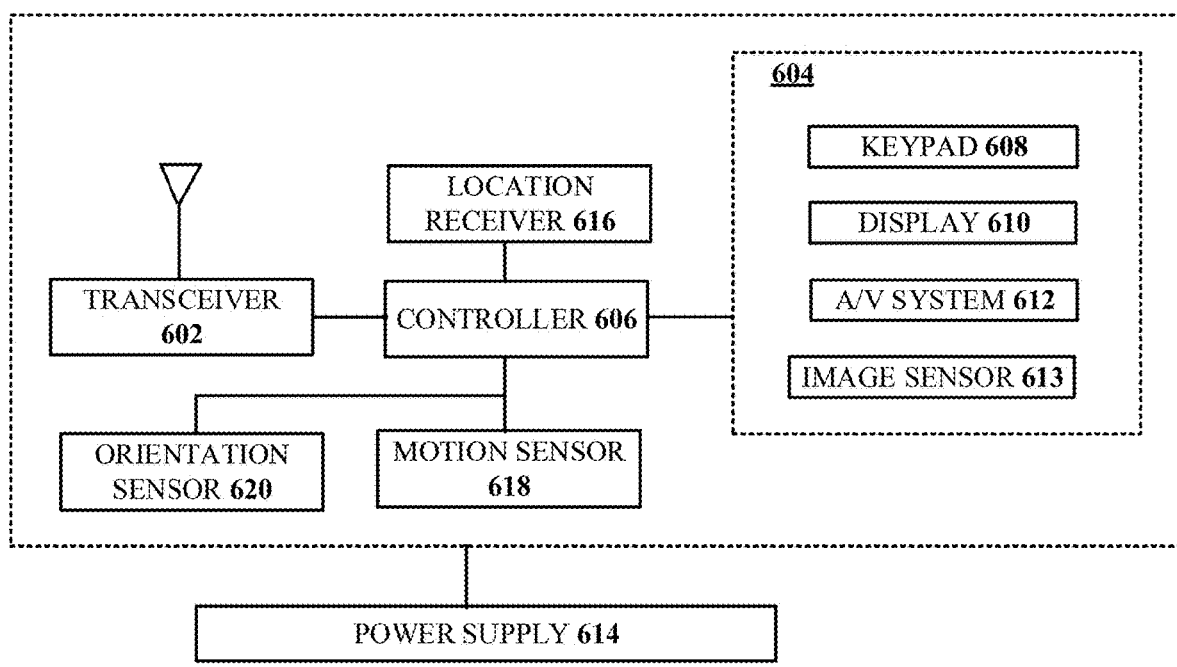
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part a method, device and computer readable medium for planning a communication network in the communication environment 100 of FIG. 1. The communication device 600 may in some examples be a handset or mobile device operating on one or more of the communication networks of the communication environment 100 of FIG. 1.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method for communication network planning, the method comprising:
    collecting and storing, by a processing system including a processor, data associated with a communication environment including one or more communication networks operated by a system operator, the data including environmental data, network data for the one or more communication networks, importance metrics data and forecasting data, wherein respective communication networks of the one or more communication networks employ respective communication technologies for wireless communication between the one or more communication networks operated by the system operator and remote user devices in the communication environment;
    providing, by the processing system, traffic forecasts of communication traffic on the one or more communication networks;
    creating, by the processing system, enrichment layers for potential build locations for equipment of the one or more communication networks, wherein the creating is based on physical attributes of a potential build location, wherein the enrichment layers include enrichment information about modifiable aspects of the physical attributes of the potential build location;
    identifying, by the processing system, desirable build locations among the potential build locations of the one or more communication networks based on the traffic forecasts of communication traffic, the enrichment information for the physical attributes for the potential build locations, and based on information about subscribers having an expressed particular interest in activities performed in conjunction with communication devices or communication services available on the one or more communication networks;
    providing, by the processing system, interactive visualization for a user with the communication environment, including:
        providing, by the processing system, a user interface configured to receive user inputs of the system operator, the user inputs specifying a forecast scenario to be tested for expansion, development or reconfiguration of the one or more communication networks operated by the system operator;
        prompting, by the processing system at the user interface, entry of a user input objective of the system operator, the user input objective specifying a business or technological objective of the system operator for the expansion, development or reconfiguration of the one or more communication networks operated by the system operator;
        receiving, by the processing system, at the user interface, user input defining planning parameters for the communication environment, the planning parameters comprising information defining wireless communication technologies of interest to the system operator, a geographic region for possible expansion by the one or more communication networks operated by the system operator, and financial criteria of the system operator, the financial criteria including one or more constraints including a predetermined limit on capital spending by the system operator and a minimum capital return rate required by the system operator;
        receiving, by the processing system at the user interface, user input of the system operator defining a respective cost of each respective wireless communication technology of interest to the system operator, a respective network quality score for each respective desirable build location for each respective wireless communication technology of interest to the system operator, a revenue gain for each respective desirable build location as a function of the respective network quality score for the each respective desirable build location, and a revenue loss for subscriber churn for respective desirable build location site as a function of respective network quality score for the each respective desirable build location;
        determining, by the processing system, respective target goal values for respective build options for the one or more communication networks, the determining based on the planning parameters for the communication environment, the identified desirable build locations and the traffic forecasts of communication traffic, including selecting a selected wireless network configuration and a selected wireless network technology to identify an optimal technology deployment to maximize total net return on investment by the system operator according to the financial criteria;

providing, by the processing system, at the user interface, a visualization of the selected wireless network configuration, the visualization including three-dimensional imagery that can be interactively explored in response to user input;

prompting, by the processing system at the user interface, user inputs of the system operator, the user inputs specifying modifications to the planning parameters to test effect of a specified modification to one or more of the planning parameters;

receiving, at the user interface, the modifications to the planning parameters for the communication environment;

determining revised respective target goal values according to the modifications to the planning parameters;

providing, at the user interface, a revised visualization of the selected wireless network configuration based on the revised respective target goal values; and receiving, by the processing system, further user inputs of the system operator, the further user inputs specifying further modifications to the planning parameters to test further effects of specified modifications to one or more of the planning parameters; and continuing the receiving further user inputs by the processing system until the expansion, development or reconfiguration of the one or more communication networks operated by the system operator has been achieved according to the financial criteria.

2. The method of claim 1 wherein the receiving further user inputs specifying modifications to the planning parameters comprises:

receiving, by the processing system, other user input at the user interface, the other user input defining variations in communication traffic on the one or more communication networks, wherein the receiving other user input comprises receiving user input defining a change to the subscribers having an expressed particular interest in activities performed in conjunction with communication devices or communication services available on the one or more communication networks;

determining, by the processing system, variations in the respective target goal values for the respective build options based on the variations in communication traffic on the one or more communication networks, forming a revised wireless network configuration; and providing an augmented reality (AR) or virtual reality (VR) visualization of the revised wireless network configuration.

3. The method of claim 2 further comprising selecting, by the processing system, an optimal set of communication technologies for build or expansion of a respective communication network of the one or more communication networks in response to the variations in the respective target goal values.

4. The method of claim 1 wherein the providing the traffic forecasts of communication traffic comprises:

providing, by the processing system, information about variation in time in the communication traffic on the one or more communication networks.

5. The method of claim 1 wherein the providing the traffic forecasts of communication traffic comprises:

providing, by the processing system, information about the traffic forecasts organized by type of subscriber device active on the one or more communication networks, and by a type of technology used by subscriber devices active on the one or more communication networks.

6. The method of claim 5 further comprising:

receiving, by the processing system, information identifying the subscribers having an expressed particular interest in activities performed in conjunction with communication devices or communication services available on the one or more communication networks; and receiving, by the processing system, information about a quantity of the subscribers having the expressed particular interest.

7. The method of claim 6 wherein the providing the traffic forecasts of communication traffic comprises:

receiving, by the processing system, a forecast of a selection of new devices among a set of subscribers having an expressed particular interest in early adoption of new technology, relative importance of data or voice communication, or an interest in activities performed in conjunction with communication devices or communication services available on the one or more communication networks, and wherein the identifying desirable build locations comprises identifying the desirable build locations based on the forecast.

8. The method of claim 1 wherein the receiving user input defining planning parameters for the communication environment comprises:

receiving, by the processing system, information defining one or more forecast scenarios for expansion, development or reconfiguration of one or more communication networks.

9. The method of claim 8 wherein receiving the user input defining planning parameters for the communication environment comprises:

receiving, by the processing system, from the user interface, information defining changes to a mix of subscriber devices operating on the one or more communication networks and new services proposed for a communication network; and receiving, by the processing system, from the user interface, an objective for communication network planning, wherein the determining respective target goal values for the respective build options comprises optimizing an operational factor for the respective build options.

10. The method of claim 9 wherein the optimizing an operational factor for the respective build options comprises optimizing, by the processing system, one of a return on investment and a network capacity.

11. A device, comprising:

a processing system including a processor; and a memory that stores executable instructions that, when executed by the processing system, facilitate performance of operations, the operations comprising:

collecting and storing data about a communication environment including one or more communication networks operated by a system operator, the data including environmental data, network data for the one or more communication networks, importance metrics data and forecasting data, wherein respective communication networks of the one or more communication networks employ respective communication technologies for wireless communication between the one or more communication networks operated by the system operator and remote user devices in the communication environment;

creating enrichment layers for potential build locations for equipment of the one or more communication networks, wherein the creating is based on one or more modifiable aspects of physical attributes of a potential build location;

identifying desirable build locations among the potential build locations of the one or more communication networks based on the enrichment layers for the potential build locations and;

providing, at a user device, a user interface configured to receive user inputs of the system operator, the user inputs specifying a forecast scenario to be tested for expansion, development or reconfiguration of the one or more communication networks operated by the system operator;

prompting, at the user interface, a user input objective of the system operator, the user input objective specifying a business or technological objective of the system operator for the expansion, development or reconfiguration of the one or more communication networks operated by the system operator;

providing iterative, interactive visualization for planning the one or more communication networks, including prompting, at the user interface, entry of a user input objective of the system operator, the user input objective specifying a business or technological objective of the system operator for the expansion, development or reconfiguration of the one or more communication networks operated by the system operator;

at the user interface, receiving planning parameters for the communication environment, the planning parameters comprising information defining wireless communication technologies of interest to the system operator, a geographic region for possible expansion by the one or more communication networks operated by the system operator, and financial criteria of the system operator, the financial criteria including one or more constraints including a predetermined limit on capital spending by the system operator and a minimum capital return rate required by the system operator;

receiving, at the user interface, user input of the system operator defining a respective cost of each respective wireless communication technology of interest to the system operator, a respective network quality score for each respective desirable build location for each respective wireless communication technology of interest to the system operator, a revenue gain for each respective desirable build location as a function of the respective network quality score for the each respective desirable build location, and a revenue loss for subscriber churn for respective desirable build location site as a function of respective network quality score for the each respective desirable build location;

determining respective target goal values for respective build options for the one or more communication networks, the determining based on the planning parameters for the communication environment and the identified desirable build locations, wherein the determining respective target goal values comprises selecting a selected wireless network configuration and a selected wireless network technology to identify an optimal technology deployment to maximize total net return on investment by the system operator according to the financial criteria, including selecting a selected wireless network configuration and a selected wireless technology;

providing, at the user interface, a visualization of the selected wireless network configuration, the visualization including three-dimensional imagery that can be interactively explored in response to user input;

prompting, at the user interface, user inputs of the system operator, the user inputs specifying modifications to the planning parameters to test effect of a specified modification to one or more of the planning parameters;

receiving, at the user interface, the modifications to the planning parameters for the communication environment;

determining respective revised target goal values according to the modifications to the planning parameters;

providing, at the user interface, a revised visualization of the selected wireless network configuration based on the respective revised target goal values; and receiving, at the user interface, further user inputs of the system operator, the further user inputs specifying further modifications to the planning parameters to test further effects of specified modifications to one or more of the planning parameters, the receiving further user inputs continuing until the expansion, development or reconfiguration of the one or more communication networks operated by the system operator has been achieved according to the financial criteria.

12. The device of claim 11, wherein the receiving planning parameters comprises:
receiving information defining forecast scenarios for expansion, development or reconfiguration of the one or more communication networks.

13. The device of claim 11, wherein the receiving planning parameters comprises:
receiving information defining financial criteria for investment in the one or more communication networks and build priority information for expansion, development or reconfiguration of the one or more communication networks.

14. The device of claim 13, wherein the operations further comprise:
receiving traffic forecasts of communication traffic on the one or more communication networks, and wherein the determining respective target goal values for respective build options comprises determining a return on investment based at least in part on the traffic forecasts of communication traffic.

15. The device of claim 14 further comprising receiving information about subscribers having an expressed particular interest in activities performed in conjunction with communication devices or communication services in the communication environment including:
receiving information about adopters of a new communication technology or services, and wherein the determining respective target goal values for respective build options comprises determining a return on investment based at least in part on the information about early adopters.

16. A non-transitory machine-readable medium, comprising executable instructions that, when executed by a processing system including a processor, facilitate performance of operations, the operations comprising:

collecting and storing, by a processing system including a processor, data about a communication environment including one or more communication networks operated by a system operator, the data including environmental data, network data for the one or more communication networks, importance metrics data and forecasting data, wherein respective communication networks of the one or more communication networks employ respective wireless communication technologies for wireless communication between the one or more communication networks operated by the system operator and remote user devices in the communication environment;

providing, by the processing system, build forecast information for build options on the one or more communication networks;

creating, by the processing system, enrichment layers for potential build locations for equipment of the one or more communication networks, wherein the creating is based on physical attributes of a potential build location;

identifying, by the processing system, one or more desirable build locations among the potential build locations of the one or more communication networks based on the enrichment layers for the potential build locations;

providing iterative, interactive visualization for planning the one or more communication networks, including providing a user interface configured to receive user inputs of the system operator, the user inputs specifying a forecast scenario to be tested for expansion, development or reconfiguration of the one or more communication networks operated by the system operator;

prompting, at the user interface, entry of a user input objective of the system operator, the user input objective specifying a business or technological objective of the system operator for the expansion, development or reconfiguration of the one or more communication networks operated by the system operator;

receiving, by the processing system, at the user interface, one or more planning parameters for the communication environment, the planning parameters comprising information defining wireless communication technologies of interest to the system operator, a geographic region for possible expansion by the one or more communication networks operated by the system operator, and financial criteria of the system operator, the financial criteria including one or more constraints including a predetermined limit on capital spending by the system operator and a minimum capital return rate required by the system operator;

receiving, at the user interface, user input of the system operator defining a respective cost of each respective wireless communication technology of interest to the system operator, a respective network quality score for each respective desirable build location for each respective wireless communication technology of interest to the system operator, a revenue gain for each respective desirable build location as a function of the respective network quality score for the each respective desirable build location, and a revenue loss for subscriber churn for respective desirable build location site as a function of respective network quality score for the each respective desirable build location; and determining, by the processing system, respective target goal values for respective build options for the one or more communication networks, the determining based on the one or more planning parameters for the communication environment, the identified one or more desirable build locations and the build forecast information, wherein the determining respective target goal values comprises determining a selected wireless network configuration or a wireless network reconfiguration for the one or more communication networks and selecting a selected wireless network technology among the wireless communication technologies of interest to the system operator, wherein the determining respective target goal values comprises identifying an optimal technology deployment to maximize total net return on investment by the system operator according to the financial criteria;

providing, by the processing system, at the user interface, a visualization of the selected wireless network configuration, the visualization including three-dimensional imagery that can be interactively explored in response to user input;

prompting, at the user interface, user inputs of the system operator, the user inputs specifying modifications to the planning parameters to test effect of a specified modification to one or more of the planning parameters;

receiving, at the user interface, the modifications to the planning parameters for the communication environment;

determining revised respective target goal values according to the modifications to the planning parameters;

providing, at the user interface, a revised visualization of the selected wireless network configuration based on the respective revised target goal values and receiving, at the user interface, further user inputs of the system operator, the further user inputs specifying further modifications to the planning parameters to test further effects of specified modifications to one or more of the planning parameters; and continuing the receiving further user inputs at the user interface until the expansion, development or reconfiguration of the one or more communication networks operated by the system operator has been achieved according to the financial criteria.

17. The non-transitory machine-readable medium of claim 16, wherein the operations further comprise:
receiving respective build cost information for the respective build options on respective communication networks of the communication environment; and
prioritizing one or more build options based on the respective build cost information for the identified one or more desirable build locations.

18. The non-transitory machine-readable medium of claim 17, wherein the operations further comprise:
receiving one or more financial metrics;
receiving one or more technological metrics; and
prioritizing one or more build options based on the respective build cost information for the identified one or more desirable build locations.

19. The non-transitory machine-readable medium of claim 18 wherein the receiving one or more financial metrics comprises receiving a return on investment to optimize and wherein the receiving one or more technological metrics comprises receiving a communication network capacity metric, and wherein prioritizing one or more build options comprises determining optimal technology deployment options to optimize the return on investment, wherein a network plan is developed based on the optimal technology deployment options.

20. The non-transitory machine-readable medium of claim 19, wherein the operations further comprise:
   building out one or more of the communication networks of the communication environment in accordance with the network plan.

\* \* \* \* \*